US011929530B2

(12) United States Patent
Jia

(10) Patent No.: US 11,929,530 B2
(45) Date of Patent: Mar. 12, 2024

(54) HYDRATED MAGNESIUM HYDRIDE ENERGY SYSTEM

(71) Applicant: SHANGHAI COVAPOR ENERGY TECHNOLOGY CO., LTD, Shanghai (CN)

(72) Inventor: Peng Jia, Shanghai (CN)

(73) Assignee: Shanghai Covapor Energy Technology Co., Ltd, Shanghai (CN)

( * ) Notice: Subject to any disclaimer, the term of this patent is extended or adjusted under 35 U.S.C. 154(b) by 494 days.

(21) Appl. No.: 16/755,538

(22) PCT Filed: Nov. 13, 2018

(86) PCT No.: PCT/CN2018/115260
§ 371 (c)(1),
(2) Date: Apr. 10, 2020

(87) PCT Pub. No.: WO2019/096132
PCT Pub. Date: May 23, 2019

(65) Prior Publication Data
US 2020/0381757 A1    Dec. 3, 2020

(30) Foreign Application Priority Data
Nov. 14, 2017    (CN) .......................... 201711121685.5

(51) Int. Cl.
*H01M 8/065* (2016.01)
*B01D 53/04* (2006.01)
(Continued)

(52) U.S. Cl.
CPC ............ *H01M 8/065* (2013.01); *B01D 53/04* (2013.01); *B01D 53/229* (2013.01); *B01D 53/44* (2013.01);
(Continued)

(58) Field of Classification Search
CPC ............. H01M 8/065; H01M 8/04014; H01M 8/04029; H01M 8/04111; H01M 8/04201;
(Continued)

(56) References Cited

U.S. PATENT DOCUMENTS

2002/0166286 A1    11/2002    McClaine et al.
2006/0138996 A1     6/2006    Graham et al.
(Continued)

FOREIGN PATENT DOCUMENTS

CN    101572321 A    11/2009
CN    104379499 A     2/2015
(Continued)

OTHER PUBLICATIONS

15. Ortiz et al., "Thermodynamic analysis of a heat-driven metal hydride cogeneration cycle" International Journal of Thermal Sciences, vol. 40, Iss. 2. Feb. 2001, p. 165-172. (Year: 2001).*

*Primary Examiner* — Jonathan G Jelsma
(74) *Attorney, Agent, or Firm* — Robert L. Stearns; Dickinson Wright PLLC

(57) ABSTRACT

An energy system with hydration of magnesium hydride, including: a magnesium hydride storage tank, a Covapor unit, a storage battery, a hydrogen buffer and temperature regulation tank, a meter, a molecular sieve filter, a hydrogen fuel cell, an exhaust gas purifier, a water tank, and an air purifier. A water outlet of the hydrogen fuel cell is connected to a water inlet of the magnesium hydride storage tank. A hydrogen outlet of the magnesium hydride storage tank is connected to a hydrogen inlet of the hydrogen fuel cell. A thermal conductive medium outlet of the magnesium hydride storage tank is connected to a jacket of the molecular sieve filter and the Covapor unit, respectively, and a jacket outlet of the molecular sieve filter and an outlet of the Covapor unit are respectively connected to a thermal con- (Continued)

ductive medium inlet of the magnesium hydride storage tank.

11 Claims, 7 Drawing Sheets

(51) Int. Cl.
| | |
|---|---|
| B01D 53/22 | (2006.01) |
| B01D 53/44 | (2006.01) |
| B01D 53/62 | (2006.01) |
| B01D 53/75 | (2006.01) |
| B01D 53/86 | (2006.01) |
| B60L 50/72 | (2019.01) |
| B60L 50/90 | (2019.01) |
| C01B 3/00 | (2006.01) |
| C25B 1/00 | (2021.01) |
| H01M 8/04014 | (2016.01) |
| H01M 8/04029 | (2016.01) |
| H01M 8/04082 | (2016.01) |
| H01M 8/04111 | (2016.01) |
| H01M 8/0438 | (2016.01) |
| H01M 8/0662 | (2016.01) |
| H01M 8/0668 | (2016.01) |

(52) U.S. Cl.
CPC ............ *B01D 53/62* (2013.01); *B01D 53/75* (2013.01); *B01D 53/8631* (2013.01); *B01D 53/8675* (2013.01); *B60L 50/72* (2019.02); *B60L 50/90* (2019.02); *C01B 3/0026* (2013.01); *C25B 1/00* (2013.01); *H01M 8/04014* (2013.01); *H01M 8/04029* (2013.01); *H01M 8/04111* (2013.01); *H01M 8/04201* (2013.01); *H01M 8/04395* (2013.01); *H01M 8/04425* (2013.01); *H01M 8/0668* (2013.01); *H01M 8/0687* (2013.01); *B01D 2253/102* (2013.01); *B01D 2253/116* (2013.01); *B01D 2257/106* (2013.01); *B01D 2257/404* (2013.01); *B01D 2257/502* (2013.01); *B01D 2257/708* (2013.01); *B01D 2258/0208* (2013.01); *B01D 2259/4541* (2013.01); *B01D 2259/4566* (2013.01)

(58) Field of Classification Search
CPC ......... H01M 8/04395; H01M 8/04425; H01M 8/0668; H01M 8/0687; H01M 8/0662; H01M 8/0606; H01M 2220/20; H01M 2220/30; H01M 2250/20; H01M 2250/30; B01D 53/75
See application file for complete search history.

(56) References Cited

U.S. PATENT DOCUMENTS

| | | | |
|---|---|---|---|
| 2010/0055517 | A1 | 3/2010 | Uzhinsky et al. |
| 2011/0311895 | A1 | 12/2011 | Spare et al. |
| 2022/0166286 | A1 | 5/2022 | McClaine et al. |

FOREIGN PATENT DOCUMENTS

| | | | |
|---|---|---|---|
| CN | 104555916 | A | 4/2015 |
| CN | 106006552 | A | 10/2016 |
| CN | 106224088 | A | 12/2016 |
| CN | 106337730 | A | 1/2017 |
| CN | 106351735 | A | 1/2017 |
| CN | 106541816 | A | 3/2017 |
| CN | 106627090 | A | 5/2017 |
| CN | 106837529 | A | 6/2017 |
| CN | 106915235 | A | 7/2017 |
| CN | 106969259 | A | 7/2017 |
| CN | 108011118 | A | 5/2018 |
| JP | 2009099534 | A * | 5/2009 |

* cited by examiner

HYDRATED MAGNESIUM HYDRIDE ENERGY SYSTEM

CROSS REFERENCE TO RELATED APPLICATIONS

The present application is a 35 U.S.C. § 371 national stage application of PCT Application Ser. No. PCT/CN2018/115260, filed on Nov. 13, 2018, which claims priority to Chinese Patent Application Ser. No. CN201711121685.5, filed on Nov. 14, 2017, the entire contents of which are incorporated herein by reference in their entireties.

TECHNICAL FIELD

The present application relates to the field of hydrogen energy, and more particularly to an energy system with hydration of magnesium hydride.

BACKGROUND

Environmental pollution and energy shortage have become prominent issues in today's society. In order to develop clean new energy, countries around the world are developing nuclear energy, solar energy, geothermal energy, wind energy, biological energy, marine energy, and hydrogen energy in addition to fossil fuels in accordance with local conditions. Hydrogen energy has been considered to be one of the most promising new energy in the future. However, as limited by many factors, such as techniques regarding preparation, storage, and application, cost, service life, and the reliability, the development and application of the hydrogen fuel become difficult to realize market operation. In particular in the field of new energy vehicle, hydrogen fuel vehicles have been invested into a lot of material and manpower by the vehicle manufacturers around the word in order develop the hydrogen fuel vehicles, however, for the above reasons, in particular the difficulties in the storage and transportation of hydrogen energy, the widespread promotion and application of hydrogen fuel vehicles are seriously restricted.

At present, the storage and transportation of hydrogen can be realized by high-pressure gas cylinder, liquid hydrogen, solvent, and metal hydride, etc., with each having disadvantages. Hydrogen storage by metal hydride, compared with other storage manners, is advantageous in high density of hydrogen storage and safe storage, but how to further improve the hydrogen storage density of the metal hydride and economically and efficiently realize the practical application of the metal hydride is still a key breakthrough in the field of hydrogen energy source. Metal magnesium is a prominent hydrogen storage material in the field of hydrogen storage metal, which has a high hydrogen storage content of 7.6 wt. %, low price, abundant resources, good hydrogen absorption and release platform, and pollution free. In addition, magnesium hydrogen belongs to strong reducing agent, which can directly and violently react with water to generate hydrogen and magnesium hydroxide to emit a large amount of heat. The large amount of heat released from reactions can output to the external for use.

SUMMARY

The present application relates to an energy system with hydration of magnesium hydride, which fully utilizes the magnesium hydride to release hydrogen and utilizes the hydrogen fuel cell to generate power, thereby improving the utilization rate of the hydrogen energy source, reducing and avoiding the greenhouse gas discharge, protecting the nature environment, and establishing the ecological civilization.

Technical solutions of the present application are as follows: an energy system with hydration of magnesium hydride, comprises: a magnesium hydride storage tank, a waste heat recoverer, and a storage battery. The storage battery is electrically connected to the waste heat recoverer. The magnesium hydride storage tank is provided with a thermal conductive medium inlet, a thermal conductive medium outlet, a feeding-extraction port, a hydrogen outlet, and a water inlet. The energy system further comprises: a hydrogen buffer and temperature regulation tank, a meter, a molecular sieve filter, a hydrogen fuel cell, an air feeding port, an exhaust gas purifier, a purified gas discharge port, a water tank, a water pump, a flowmeter, and an air purifier. The hydrogen fuel cell comprises: a power output cable, an air inlet, a hydrogen inlet, a water outlet, and an exhaust gas outlet. The air feeding port is connected to the air inlet through the air purifier, and the exhaust gas outlet is connected to the purified gas discharge port through the exhaust gas purifier. The water outlet of the hydrogen fuel cell is connected to the water tank, a water outlet of the molecular sieve filter is connected to the water tank, and the water tank is connected to a water feeding and regulating port. The water tank is connected to the water inlet of the magnesium hydride storage tank through a water pump and a flowmeter. A filtration membrane is arranged at a pipeline at the water inlet, and the filtration membrane is an ion exchange membrane or a reverse osmosis membrane. The hydrogen outlet of the magnesium hydride storage tank is connected to the hydrogen inlet of the hydrogen fuel cell through the molecular sieve filter, the hydrogen buffer and temperature regulation tank, and the meter. The thermal conductive medium outlet of the magnesium hydride storage tank is diverged into three paths, a first path being connected to a jacket inlet of the molecular sieve filter through a thermal conductive oil pipeline, a second path being connected to the waste heat recoverer through the thermal conductive oil pipeline, and a third path being connected to an insulation jacket of the storage battery through the thermal conductive oil pipeline. A jacket outlet of the molecular sieve filter is connected to the thermal conductive medium inlet of the magnesium hydride storage tank, an outlet of the waste heat recoverer is connected to the thermal conductive medium inlet of the magnesium hydride storage tank, and an outlet of the insulation jacket of the storage battery is connected to the thermal conductive medium inlet of the magnesium hydride storage tank.

In condition that the hydrogen fuel cell is replaced by a hydrogen piston internal combustion engine or a hydrogen gas turbine and pure oxygen is used as a combustion gas, the water and hydrogen-containing exhaust gas discharged out of the hydrogen piston internal combustion engine or the hydrogen gas turbine via an exhaust gas outlet thereof enters the magnesium hydride storage tank through the water tank and the filtration membrane. Magnesium hydride in the magnesium hydride storage tank is replaced by metal magnesium, and magnesium hydride or metal magnesium in the magnesium hydride storage tank is converted into magnesium hydroxide by hydration, or magnesium oxide by heating, or a mixture thereof, reaction products are removed from the magnesium hydride storage tank, and saturated magnesium hydride or metal magnesium is added. Or alternatively, magnesium hydride in the magnesium hydride storage tank does not react with water, but is directly converted into metal magnesium by heating to release hydrogen; after the metal magnesium is removed out of the magnesium hydride storage tank, a saturated magnesium hydride is added. Metals capable of reacting with hydrogen to form metal hydrides or/and capable of reacting with water to release hydrogen are suitable for the method. The metals or mixtures of any ratios of the metals, and mixtures thereof formed with other materials are also suitable for the method.

The magnesium hydride storage tank is formed by an inner wall and an outer wall of a tank body, with a heat exchange jacket formed between the inner wall and the outer wall. A water spray pipeline is arranged inside the tank body, and an insulation layer is arranged outside the tank body. A pressure sensor, an explosion-proof valve, the hydrogen outlet, the water inlet, and a temperature sensor are located at one end of the tank body; and the feeding-extraction port is located at the other end of the tank body. The feeding-extraction port is provided with a stop valve having a password lock. The tank body is a metallic material, a non-metallic material, or a combination thereof.

The energy system further comprises a magnesium hydride replacing assembly, and the magnesium hydride replacing assembly comprises: a separation tank, a magnesium hydroxide storage tank, a residual hydrogen absorption unit, a vacuum tank, a protective gas compressor, a high pressure protective gas tank, a magnesium hydride storage tank, a feeder, an extraction meter, a feeding meter, an injection gun driver mechanism, and an injection gun. The injection gun driver mechanism comprises: an outer pipe, an inner pipe, a sealing ring, a filter screen, and a locking flange. The outer pipe is connected to a protective gas pipeline, and the inner pipe is connected to a feeding-extraction common pipeline. The injection gun driver mechanism is connected to the injection gun, and the injection gun is in sealed connection with the feeding-extraction port of the magnesium hydride storage tank via the locking flange. The injection gun defines therein a protective gas inlet and a feeding-discharging port. The feeding-discharging port is connected to the separation tank via the feeding-extraction common pipeline and the extraction pipeline. A solid outlet of the separation tank is connected to the magnesium hydroxide storage tank via the extraction meter, a gas outlet of the separation tank is connected to the vacuum tank via the residual hydrogen absorption unit, and the vacuum tank is connected to the high pressure protective gas tank via the check valve and the protective gas compressor. Two paths are diverged from an outlet of the high pressure protective gas tank, one path is connected to the feeder, and the other path is connected to a protective gas inlet of the injection gun via the protective gas pipeline. The magnesium hydride supplementary storage tank is connected to the feeding-discharging port of the injection gun via the feeder, the feeding meter, the feeding pipeline, and the feeding-extraction common pipeline.

Magnesium hydroxide in the magnesium hydroxide storage tank is transported to a regeneration unit, where magnesium hydroxide is converted into magnesium hydride, and the produced magnesium hydride is then transported back for use. The regeneration utilizes the peak-shaving power of clean energy for electrolytic regeneration and hydrogenation of magnesium metal. The energy system with hydration of magnesium hydride is applied to mobile apparatuses, transportation apparatuses, fixed apparatuses, household apparatuses, kitchen stoves, power generation apparatuses, clothing and footwear, power apparatuses or construction apparatuses, and the size of the system is enlarged or minimized according to application scenarios. Or alternatively, the system adopt gravity conveyance, mechanical conveyance, pneumatic conveyance, vacuum conveyance, hydraulic conveyance, electromagnetic conveyance, and other methods, or a combination thereof, in order to replace magnesium hydride and magnesium hydroxide, or replace magnesium hydride and magnesium oxide, or replace a mixture of magnesium hydride and magnesium hydroxide-magnesium oxide, or replace metal magnesium and magnesium hydroxide, or replace metal magnesium and magnesium oxide, or replace a mixture of metal magnesium and magnesium hydroxide-magnesium oxide, or replace magnesium hydride and metal magnesium, or replace a metal that can combine with hydrogen to form a metal hydride or/and react with water to release hydrogen, or a mixture of the metal and other substances, or a hydroxide or/and an oxide of a mixture of the metal and other substances.

The energy system is installed in a vehicle, the vehicle comprises: an energy release assembly, a wheel motor, a manual control console, a central controller, and a motor driver. The hydrogen fuel cell is electrically connected to the motor driver through the power output cable, the manual control console is electrically connected to the motor driver via the central controller, and the wheel motor, the storage battery, and the motor driver are electrically connected. The electricity generated by the hydrogen fuel cell of the energy release assembly and the power generated by the waste heat recoverer are transmitted to the motor driver for driving the vehicle to run, or to the storage battery for storing the electricity, via cables according to actual operating conditions of the vehicle. The electricity recovered by the wheel motor when braking or decelerating during driving is stored in the storage battery as supplementary electricity. The thermal conductive medium of the magnesium hydride storage tank is nitrogen, the thermal conductive oil, carbon dioxide, or a heat stabilizing substance. One path diverged from the thermal conductive medium outlet is connected to the waste heat recoverer; one path is connected to a jacket inlet of the molecular sieve filter; one path is connected to an inlet of an insulation jacket of the storage battery to enable the storage battery to work in winter at a suitable temperature; and a further path is connected to the vehicle air conditioning system for heating in winter.

The energy system comprises: a mobile phone and an external feeding apparatus. The mobile phone comprises: a hydrogen fuel cell, a super safe battery box, and a password lock. The external feeding apparatus comprises: a water feeding pin, a hydride replacing pin, an automatic positioning clamp, a miniature magnesium hydride replacing assembly, a water addition/extraction assembly, a low-temperature hydrogen absorber, and an intelligent management assembly. The hydrogen fuel cell is provided with an air feeding port, a purified gas discharge port, and a super safe battery box interface module. The hydrogen fuel cell is connected to the super safe battery box interface module. The super safe battery box is provided therein with a hydrogen control module, a magnesium hydride module, and a water control module. The super safe battery box interface module is connected to the hydrogen control module through a hydrogen interface, and is connected to the water control module through a water interface. The water control module is provided with a water feeding hole, and the magnesium hydride module is provided with a hydride replacing hole. The water control module is connected to the water feeding pin via the water feeding hole, and the magnesium hydride module is connected to the hydride replacing pin via the hydride replacing hole. The mobile phone battery is arranged in the mobile phone, and the mobile phone battery is arranged in parallel or in series with the fuel cell.

Water in the water control module enters the magnesium hydride module through a membrane between the water control module and the magnesium hydride module to react with magnesium hydride to produce hydrogen and magnesium hydroxide. Hydrogen enters the hydrogen fuel cell through the hydrogen interface, and hydrogen enters the hydrogen control module through a membrane between the magnesium hydride module and the hydrogen control module. The membrane is unidirectional, and only hydrogen is allowed to enter the hydrogen control module through the magnesium hydride module. Or alternatively, the membranes are replaced with micro valves. Hydrogen in the hydrogen fuel cell reacts with the air entering through the air feeding port to produce water and generate electricity for the mobile phone. Produced water enters the water control module via the water interface. After magnesium hydride in the magnesium hydride module is completely converted into magnesium hydroxide, replacement of magnesium hydroxide is performed by inserting the mobile phone into the external feeding apparatus. During the replacement process, the mobile phone is firstly inserted into the external feeding apparatus, and the mobile phone is automatically clamped by the automatic positioning clamp. The mobile phone recognizes the pins, and when the passwords of the pins and holes match, the recognition of the password lock on the mobile phone is completed. Saturated magnesium hydride will not be added until extraction of magnesium hydroxide is completed.

Or alternatively, the mobile phone battery uses an external power to store electricity. The miniature magnesium hydride replacing assembly of the external feeding apparatus has the same structure and principle as the magnesium hydride replacing assembly, and is made of miniaturized structure of respective components; and the magnesium hydride module generally has a normal temperature of between −40 and 100° C.

The waste heat recoverer comprises: an expander, a generator, a hydrogen thermocompressor, and an intermediate reheater. An expander outlet is connected to an expander inlet through the hydrogen thermocompressor, the expander and the generator are in axial connection, and the generator is in electrical connection with an external power system. The hydrogen thermocompressor can adopt a multistage step utilization mode, and each step is composed of multiple reaction beds loaded with a metal hydrogen storage material, including but not limited to a rare-earth metal hydride. Low-pressure hydrogen enters the reaction beds via a low-pressure hydrogen inlet, the low-pressure hydrogen is absorbed by the hydrogen storage material to form a metal hydride, and the metal hydride after hydrogen absorption is heated to release high-pressure hydrogen. An operation mode of each reaction bed adopts either a direct extraction and replacement mode by the internal metal hydride, or an indirect heat exchange mode, the metal hydride in the reaction bed is mainly a rare earth, such that hydrogen in the waste heat recoverer is heated and boosted by the heat carried by the thermal conductive medium circulation pipeline and enters to the expander to do work, thereby driving the generator to generate electricity.

The waste heat recoverer adopts a complex waste heat recoverer comprising: a first heat exchanger, a second heat exchanger, a third heat exchanger, a fourth heat exchanger, a fifth heat exchanger, a first hydrogen reaction bed group, a second hydrogen reaction bed group, a third hydrogen reaction bed group, an expander, a compression and expansion combined cycle assembly, a thermal conductive medium circulation inlet pipeline, and a thermal conductive medium circulation outlet pipeline. The compression and expansion combined cycle assembly comprises: a working fluid compressor, a working fluid expander, a sixth heat exchanger, and a seventh heat exchanger. The expander, the working fluid compressor, and the working fluid expander are coaxially connected, or not coaxially connected. The working fluid compressor and the working fluid expander are in cyclic connection with the seventh heat exchanger and the sixth heat exchanger in sequence, and the seventh heat exchanger dissipates heat to an ambient environment or to a cooling water. The thermal conductive medium circulation inlet pipeline is connected to a thermal conductive medium circulation inlet of the first heat exchanger, and the first heat exchanger is connected to the thermal conductive medium circulation outlet pipeline through the second heat exchanger, the third heat exchanger, the fourth heat exchanger, and the fifth heat exchanger sequentially. The first heat exchanger is in cyclic connection with the first hydrogen reaction bed group, the second heat exchanger is in cyclic connection with the second hydrogen reaction bed group, the third heat exchanger is in cyclic connection with the third hydrogen reaction bed group, the expander is in cyclic connection with the fourth heat exchanger, the fifth heat exchanger in cyclic connection with the sixth heat exchanger, and the sixth heat exchanger is in connection with the seventh heat exchanger. The first hydrogen reaction bed group, the second hydrogen reaction bed group, and the third hydrogen reaction bed group are respectively in cyclic connection with the expander, the expander is in cyclic connection with the sixth heat exchanger, and the sixth heat exchanger is connected to an inlet of the working fluid compressor, and an outlet of the working fluid expander is connected to the seventh heat exchanger. The first hydrogen reaction bed group is in cyclic connection with the second hydrogen reaction bed group, the second hydrogen reaction bed group is in cyclic connection with the third hydrogen reaction bed group, and the third hydrogen reaction bed group is in cyclic connection with the sixth heat exchanger, and the six heat exchanger is connected to the seventh heat exchanger. The stage and the number of the hydrogen reaction bed group is increased or reduced if a temperature of an original exhaust heat is higher or lower than 600° C.

Exhaust heat at 600° C. of a piston-type internal combustion engine or a gas turbine is used to generate electricity. The exhaust heat at 600° C. is introduced to the first hydrogen reaction bed group, the second hydrogen reaction bed group, and the third hydrogen reaction bed group in sequence through the thermal conductive medium heat flow pipeline. Then, low-temperature waste heat of the exhaust gas is further utilized by the compression and expansion combined cycle assembly to continue to do work for power generation, such that all the heat at above 35° C. in the exhaust gas is completely utilized.

The expander is divided into at least one group of blades, and each group of blades has at least one stage, and at least one tap of each group of blades exchanges heat with a last stage of heat exchanger.

The low-temperature waste heat at between −50 and 100° C. is used by the compression and expansion combined cycle assembly to continue to do work for power generation. The low-temperature waste heat at above a selected temperature comes from three parts: a first part is all the heat collected after full thermal insulation of the entire piston internal combustion engine or the gas turbine and the exhaust system; a second part is the heat dissipated from the hydrogen reaction bed groups and the expander in the Covapor device; and a third part is the heat released from hydrogen absorption of the last stage of hydrogen reaction bed group. The above three parts of heat are brought into the sixth heat exchanger and heat the working medium to no less than the selected temperature, the heated working medium is compressed by the working fluid compressor to an increased temperature. A dynamic of the working fluid compressor comes from the expander, and all or a part of the dynamic of the expander is used to drive the working fluid compressor to do work via the working fluid expander 88, making an outlet of the working fluid expander 88 having a temperature of higher than or equal to the selected temperature and a pressure of higher than or equal to 0.1 MPa. Thereafter, the working medium enters the seventh heat exchanger to dissipate heat to an ambient environment or to a cooling water, decreasing the temperature to no higher than the temperature of the ambient environment or the cooling water, thereafter enters the sixth heat exchanger, thereby doing work in a cyclic manner. The working medium is dioxide or other organic compounds. A part of the dynamic of the expander is used to drive the working fluid compressor to operate, and the other part of the dynamic of the expander is output in the form of shaft work. The energy release assembly and an energy consumption unit are used separately or together for fixed apparatuses, mobile apparatuses, transportation apparatuses, or household apparatuses. The replacing assembly is placed in a fixed place or installed on a mobile apparatus. At least two methods are applied to replace the magnesium hydride storage tank: a first method is to replace the magnesium hydride storage tank as a whole, and a newly replaced storage tank is filled with magnesium hydride absorbing hydrogen to a saturated state; and a second method is to replace the used magnesium hydride with saturated magnesium hydride. The methods for replacing the magnesium hydride storage tank are also applicable to fuel cell vehicles and other hydrogen fuel powered apparatuses or fixed apparatuses or mobile apparatuses or household apparatuses carrying magnesium hydride. The replacement method of the magnesium hydride supplementary storage tank can be a fixed or mobile injection platform. Magnesium hydride in the magnesium hydride supplementary storage tank may also be replaced with metallic magnesium.

One or more inorganic or organic substances or mixtures thereof with a certain proportion suitable for a circulating antifreeze system are added to the water tank in winter. An antifreeze aqueous solution having a certain concentration is formed in the water tank, and a filtration membrane is arranged at an outlet of the water tank, such that the inorganic or organic substances or mixtures thereof are always retained in the water tank, a soft water after penetrating the filtration membrane is introduced to the magnesium hydride storage tank, thereby preventing the low temperature antifreeze problem of the water system in winter. In condition that excess hydrogen exists in the pipeline between the water tank and the magnesium hydride storage tank, hydrogen is ensured to pass through the filtration membrane and enter the magnesium hydride storage tank. The exhaust gas purifier is composed of four modules: a $NO/O_3$ catalytic reducer, an activated carbon adsorber, a CO/VOC oxidizer, and a particulate ion adsorber. The $NO/O_3$ catalytic reducer, the activated carbon adsorber, the CO/VOC oxidizer, and the particulate ion adsorber are sequentially connected.

The energy system is applied to a power system of footwear, a temperature adjustment system of clothes, and the charging endurance of electric vehicles, comprising slow or fast charging of electric vehicles during running or stopping process according to battery requirements. The supply of magnesium hydride for the energy system adopts an intelligent networked operation mode, and at the same time the distribution service of goods is provided for users of transportation apparatuses when replacing magnesium hydride is required.

The energy system comprises a complex waste heat recoverer, comprising: a hydrogen reaction bed, a primary heat exchanger, a secondary heat exchanger, a final heat exchanger, an expander, a compression and expansion combined cycle assembly, a 60° C. power plant exhaust steam pipeline, and a 60° C. hot water pipeline. The compression and expansion combined cycle assembly comprises: a working fluid compressor, a working fluid expander, a sixth heat exchanger, and a seventh heat exchanger. The expander, the working fluid compressor, and the working fluid expander are shaft-connected. The 60° C. power plant exhaust steam pipeline is connected to the 60° C. hot water pipeline through the primary heat exchanger, the secondary heat exchanger, and the final heat exchanger sequentially. A hydrogen outlet of the hydrogen reaction bed is connected to an inlet of the expander, and an outlet of the expander is connected to a hydrogen inlet of the hydrogen reaction bed. The primary heat exchanger is in cyclic connection with the hydrogen reaction bed, the secondary heat exchanger is in cyclic connection with a middle section of the expander, the final heat exchanger is in cyclic connection with the sixth heat exchanger, the hydrogen reaction bed is in cyclic connection with the sixth heat exchanger, the sixth heat exchanger is connected to an inlet of the working fluid compressor, an outlet of the working fluid expander is connected to the seventh heat exchanger, the sixth heat exchanger is connected to the seventh heat exchanger, and the seventh heat exchanger dissipates heat to an ambient environment or to a cooling water.

The exhaust steam from the power plant passes the primary heat exchanger, where condensing heat is brought in and heats the hydrogen reaction beds to produce hydrogen under pressure at a certain temperature and a certain presser, the hydrogen under pressure enters the expander to do work, during which, the low-temperature hydrogen is reheated by the second heat exchanger to improve the work ability and converted into a low-pressure hydrogen after work, which enters the hydrogen reaction beds to absorption hydrogen and release heat. Low-temperature waste heat at between −50 and 100° C. is utilized by the compression and expansion combined cycle assembly to continue to do work for power generation, so as to utilize all the heat at above the selected temperature from the exhaust gas.

The metal hydride in the hydrogen thermocompressor in the waste heat recoverer carries heat directly into the hydrogen reaction beds under a hydrogen release pressure via a thermal conductive medium fluid. The thermal conductive medium fluid is a gas or a liquid, and the gas is a reducing or inert gas, comprising: hydrogen, carbon monoxide, methane, nitrogen, carbon dioxide, argon, helium, or neon; and the gas in a critical state is optionally used. The liquid is a thermal conductive oil, or a high molecular organic solvent. When the metal hydride needs to be heated to release hydrogen under a high pressure, the thermal conductive medium fluid is firstly pressurized to a hydrogen release pressure, and then the thermal conductive medium circulation pipeline is heated to a hydrogen release temperature, and then directly pumped into the hydrogen thermocompressor to heat the metal hydride, so as to realize rapid temperature rise and hydrogen release of the metal hydride under high pressure. A hydrogen outlet of each hydrogen reaction bed is provided with a high temperature high pressure resistant filtration membrane, which only allows hydrogen to flow out. The thermal conductive fluid is in cyclic connection with the thermal conductive medium circulation pipeline via a bypass, or enters the hydrogen release process in a next hydrogen thermocompressor. When the metal hydride needs to lower the temperature and absorb hydrogen at low pressure, the thermal conductive medium fluid is firstly pressurized to the hydrogen absorption pressure, and then directly pumped to the hydrogen thermocompressor where the metal hydride is cooled to the hydrogen release temperature and at the same time the heat released from the hydrogen absorption process is removed and transferred to a former stage of hydrogen reaction bed group, or other hydrogen reaction bed of the same stage, or the thermal conductive medium circulation pipe, so as to realize the fast cooling and hydrogen absorption of the metal hydride under low pressure. The hydrogen thermocompressor can also use resistance heating, induction heating, electromagnetic heating, arc heating, radiant heating; and the same also applies to the complex waste heat recoverer.

The energy system with hydration of magnesium hydride of the present application is based on the principle that magnesium hydride reacts with water to generate hydrogen and magnesium hydroxide and at the same time generate a large amount of heat. The generated hydrogen is used for the hydrogen fuel cell to generate electricity, and the waste heat recoverer and the complex Covapor are capable of revering waste heat at different temperatures for power generation. In this way, power generation efficiency is relatively high, the hydrogen energy source is effectively utilized, and the entire process has less energy loss and fewer pollutant emissions. The utilization rate of the energy source is improved, and the emission of greenhouse gas is reduced or avoided, which is conducive to protecting the natural environment and establishing the ecological civilization. The application can be used in fixed apparatuses, mobile apparatuses, and transportation apparatuses.

Figure 1:
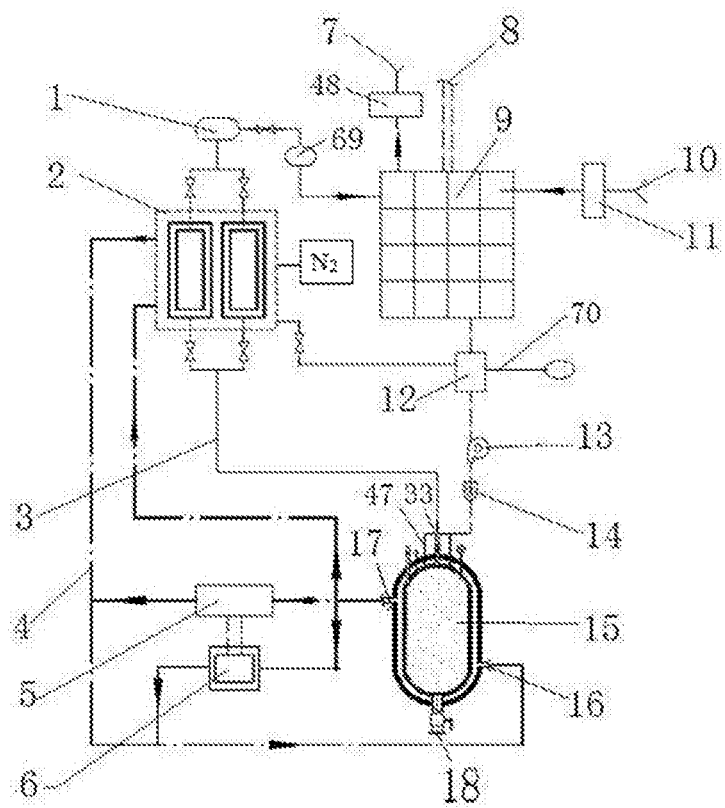
FIG. 1 is a flow chart of an energy system with hydration of magnesium hydride according to the present application.

In the drawings, the following reference numerals are used:

1—Hydrogen buffer and temperature regulation tank, 2—Molecular sieve filter, 3—Hydrogen output pipeline, 4—Thermal conductive oil pipeline, 5—Covapor unit, 6—Storage battery, 7—Purified gas discharge port, 8—Power output cable, 9—Hydrogen fuel cell,
10—Air feeding port, 11—Air purifier, 12—Water tank, 13—Water pump, 14—Flowmeter, 15—Magnesium hydride storage tank, 16—Thermal conductive medium inlet, 17—Thermal conductive medium inlet, 18—Feeding-extraction port, 19—Injection gun,
20—Separation tank, 21—Magnesium hydroxide storage tank, 22—Residual hydrogen absorption unit, 23—Vacuum tank, 24—Check valve, 25—Protective gas compressor, 26—High pressure protective gas tank, 27—Protective gas pipeline, 28—Extraction pipeline, 29—Feeding pipeline,
30—Solenoid valve, 31—Explosion-proof valve, 32—Temperature sensor, 33—Hydrogen outlet, 34—Insulation layer, 35—Pressure sensor, 36—Water spray pipeline, 37—Heat exchange jacket, 38—Tank body, 39—Stop valve with password lock,
40—Energy release assembly, 41—Wheel motor, 42—Manual control console, 43—Central controller, 44—Motor driver, 45—Magnesium hydride supplementary storage tank, 46— Feeder, 47—Water inlet, 48—Exhaust gas purifier, 49—Water control module,
50—Water feeding hole, 51—Hydrogen control module, 52—Super safe battery, 53—Water feeding pin, 54—Super safe battery box interface module, 55—Hydride replacing hole, 56—External feeding apparatus, 57—Mobile phone, 58—Password lock, 59—Automatic positioning clamp,
60—Hydrogen interface, 61—Water interface, 62—Hydride replacing pin, 63—Magnesium hydride module, 64—Expander, 65—Generator, 66—Thermal conductive medium circulation pipeline, 67—Hydrogen thermocompressor, 68—Intermediate reheater, 69—Meter,
70—Water feeding and regulating port, 71—Feeding-extraction common pipeline, 72—Extraction meter, 73—Feeding meter, 75—Injection gun driver mechanism, 76—Outer pipe, 77—Inner pipe, 78—Sealing ring, 79— Filter screen,
80—Locking flange, 81—First heat exchanger, 82—Second heat exchanger, 83—Third heat exchanger, 84—Fourth heat exchanger, 85—Fifth heat exchanger, 86—Working fluid compressor, 87—Compression and expansion combined cycle assembly, 88—working fluid expander, 89—First hydrogen reaction bed group,
90—Second hydrogen reaction bed group, 91—Third hydrogen reaction bed group, 92—Expander, 93—Sixth heat exchanger, 94—Thermal conductive medium circulation inlet pipe, 95—Thermal conductive medium circulation outlet pipeline, 96—Filtration membrane, 97—Vehicle air conditioner, 98—Mobile phone battery, 99—Gas turbine,
100—Complex waste heat recoverer, 101—Motor, 102—Seventh heat exchanger, 103—Hydrogen reaction bed, 104—Primary heat exchanger, 105—Secondary heat exchanger, and 106—Final heat exchanger.

DETAILED DESCRIPTION OF THE EMBODIMENTS

The present application will be described in detail hereinbelow with reference to the embodiments and the accompanying drawings. The protection scope of the present application is not limited to the embodiments, and any modification made by those skilled in the art within the scope defined by the claims also belongs to the protection scope of the present application.

First Embodiment

An energy system with hydration of magnesium hydride of the present application is shown in FIG. 1 and comprises: a magnesium hydride storage tank 15, a waste heat recoverer 5, a storage battery 6, a hydrogen buffer and temperature regulation tank 1, a molecular sieve filter 2, a hydrogen fuel cell 9, an air feeding port 10, an exhaust gas purifier 48, a purified gas discharge port 7, a water tank 12, a water pump 13, a flowmeter 14, and an air purifier 11. The storage battery is electrically connected to the waste heat recoverer. The hydrogen fuel cell is provided with a power output cable 8, an air inlet, a hydrogen inlet, a water outlet, and an exhaust gas outlet. The air feeding port is connected to the air inlet through the air purifier 11, and the exhaust gas outlet is connected to the purified gas discharge port through the exhaust gas purifier.

The exhaust gas purifier 48 is composed of four modules: a $NO/O_3$ catalytic reducer, an activated carbon adsorber, a $CO/VOC$ oxidizer, and a particulate ion adsorber. The $NO/O_3$ catalytic reducer, the activated carbon adsorber, the $CO/VOC$ oxidizer, and the particulate ion adsorber are connected in sequence.

Figure 2:
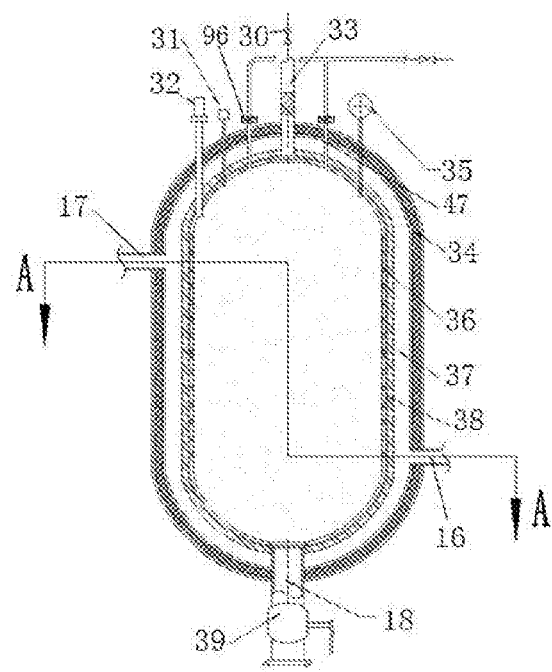
FIG. 2 is a structural schematic view of a magnesium hydride storage tank.
Figure 3:
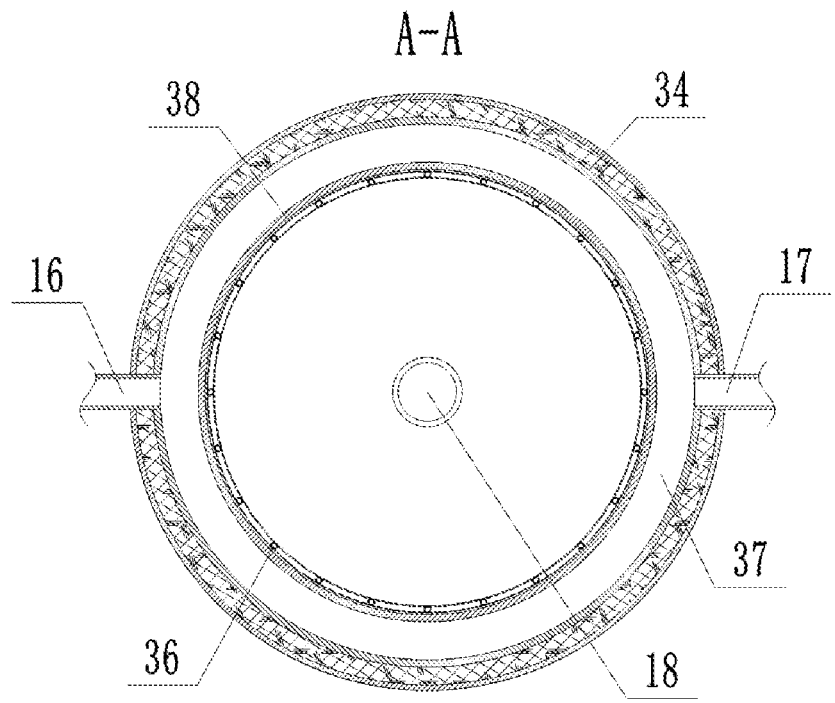
FIG. 3 is a section view taken from part A-A of FIG. 2.

As shown in FIGS. 2-3, the magnesium hydride storage tank 15 is formed by an inner wall and an outer wall of a tank body 38, with a heat exchange jacket 37 formed between the inner wall and the outer wall. A water spray pipeline 36 is arranged inside the tank body, and an insulation layer 34 is arranged outside the tank body. The magnesium hydride storage tank is provided with a thermal conductive medium inlet 16, a thermal conductive medium outlet 17, a feeding-extraction port 18, a hydrogen outlet 33, a water inlet 47, a pressure sensor 35, an explosion-proof valve 31, and a temperature sensor 32. The hydrogen outlet, the water inlet, the pressure sensor 35, the explosion-proof valve 31, and the temperature sensor 32 are located at one end of the tank body; and the feeding-extraction port 18 is located at the other end of the tank body. The feeding-extraction port is provided with a stop valve 39 having a password lock. A water outlet of the hydrogen fuel cell is connected to the water tank, a water outlet of the molecular sieve filter is connected to the water tank, and the water tank is connected to a water feeding and regulating port 70. The water tank is connected to the water inlet 47 of the magnesium hydride storage tank through a water pump, a flowmeter, and a filtration membrane 96. The hydrogen outlet of the magnesium hydride storage tank is connected to the hydrogen inlet of the hydrogen fuel cell through the molecular sieve filter, the hydrogen buffer and temperature regulation tank 1, and the meter 69. The thermal conductive medium outlet of the magnesium hydride storage tank is diverged into three paths, a first path being connected to a jacket inlet of the molecular sieve filter through a thermal conductive oil pipeline 4, a second path being connected to the waste heat recoverer through the thermal conductive oil pipeline 4, and a third path being connected to an insulation jacket of the storage battery 6 through the thermal conductive oil pipeline 4. A jacket outlet of the molecular sieve filter, an outlet of the waste heat recoverer, and the insulation jacket of the storage battery are connected to the thermal conductive medium inlet of the magnesium hydride storage tank. The molecular sieve filter is two, and the two molecular sieve filters work alternately. When one is filtering water, the molecular sieve filter dehydrates and purifies hydrogen to enable a hydrogen content to reach 99.999%; and the other functions in hydrogen regeneration, during which, the heat transferred from the thermal conductive oil is utilized.

Figure 7:
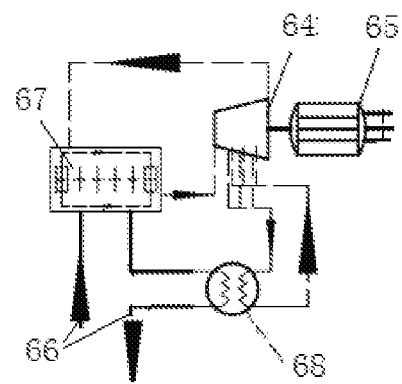
FIG. 7 is a schematic view of a waste heat recoverer.

As shown in FIG. 7, the waste heat recoverer comprises: an expander 64, a generator 65, a hydrogen thermocompressor 67, and an intermediate reheater 68. An expander outlet is connected to an expander inlet through the hydrogen thermocompressor, the expander and the generator are in axial connection, and the generator is in electrical connection with an external power system. The hydrogen thermocompressor 67 can adopt a multi-stage step utilization mode, and each step can be composed of multiple reaction beds loaded with a metal hydrogen storage material, including but not limited to a rare-earth metal hydride. A low-pressure hydrogen enters the reaction beds via a low-pressure hydrogen inlet, the low-pressure hydrogen is absorbed by the hydrogen storage material to form a metal hydride, and the metal hydride after hydrogen absorption is heated to release high-pressure hydrogen. An operation mode of each reaction bed can adopt either a direct extraction and replacement mode by the internal metal hydride, or an indirect heat exchange mode, the metal hydride in the reaction bed is mainly a rare earth, such that hydrogen in the waste heat recoverer is heated and boosted by the heat carried by the thermal conductive medium circulation pipeline and enters to the expander 64 to do work, thereby driving the generator 65 to generate electricity. A solid line in FIG. 7 is a low-temperature heat flow pipeline, and a dashed line is the hydrogen circulation pipeline inside the waste heat recoverer.

The operation mode of the energy system with hydration of magnesium hydride of the present application is as follows: water is sprayed through the water spray pipeline 36 arranged inside the tank body, and water reacts with magnesium hydride to generate hydrogen and magnesium hydroxide, as well as a large amount of heat. The water in the water tank 12 enters the magnesium hydride storage tank 15 filled with magnesium hydride through the water pump 13 and the flowmeter 14 and is sprayed into magnesium hydride in the tank through the water spray pipeline 36 arranged inside the tank body, such that magnesium hydride reacts with water to generate hydrogen and magnesium hydroxide, as well as the large amount of heat. Hydrogen enters the molecular sieve filter 2 through the hydrogen output pipeline 3 to filter out water and other protective gas, such as nitrogen, and then enters the hydrogen buffer and temperature regulation tank 1 for storage. The two molecular sieve filters alternately perform filtration, and the alternate filtration is realized by a valve. The heat released by the reaction of magnesium hydride with water is transferred to the thermal conductive oil in the heat exchange jacket 37. The thermal conductive oil carrying the heat is divided into three paths after passing through the thermal conductive medium outlet 17. A second path goes through the thermal conductive oil pipeline 4 to enter the waste heat recoverer 5, such that electricity is generated by the waste heat recoverer and then the generated electricity is stored in the storage battery. A first path goes through the thermal conductive oil pipeline 4 to enter an interlayer of the molecular sieve filter 2, so as to provide heat for regeneration in the molecular sieve filter. The regeneration temperature is 105° C., water produced from the filtration and regeneration enters the water tank 12, and the protective nitrogen is discharged. The third path goes through the thermal conductive oil pipeline to enter the thermal insulation jacket of the storage battery 6, which maintain the temperature of the storage battery in outdoor in winter, in this way, the storage battery are always maintained at a suitable temperature. The purified hydrogen in the hydrogen buffer and temperature regulation tank passes through the meter 69 to the hydrogen fuel cell, and the air entering from the air feeding port 10 is purified by the air purifier and enters the hydrogen fuel cell. The hydrogen and the air in the hydrogen fuel cell react to generate water and electricity, the generated electricity is transported to electrical devices or incorporate into a power grid via the power output cable 8, or alternatively, the generated electricity may be input into the storage battery 6 via suitable devices for charging the storage battery, in this way, the storage battery is can be used to realize the load peak regulation. The generated water passes through the water outlet to the water tank 12 and is then used as reaction water for the magnesium hydride storage tank. The exhaust gas from the hydrogen fuel cell process including the remaining air passes through the exhaust gas outlet and the exhaust gas purifier 48 and discharged from the purified gas discharge port 7.

The water tank 12 is provided with the water feeding and regulating port, which can drain water or replenish water from the outside. The exhaust gas purifier 48 is used to remove nitrogen oxides and ozone which has been brought into the air, such that the gas discharged from the purified gas discharge port 7 has a nitrogen oxide concentration of less than 5 micrograms per standard cubic meter, and an ozone concentration of less than 50 micrograms per standard cubic meters, a carbon monoxide concentration of less than 100 micrograms per standard cubic meter, a VOC concentration of less than 100 micrograms per standard cubic meter, and a particulate matter concentration of less than 50 micrograms per standard cubic meter. In this way, the pollutants brought in from the ambient atmosphere is effectively removed and lowered to a relatively low lever, thereby achieving the air purification function. The thermal conductive oil medium that carries heat can be replaced by an inert medium such as nitrogen. The magnesium hydride storage tank has an operating temperature of not exceeding 150° C. and a pressure of not exceeding 0.2 MPa. The hydrogen gas entering the hydrogen fuel cell from the hydrogen buffer and temperature regulation tank 1 has a temperature of 80° C. and a pressure of 0.18 MPa. The signals fed back by the temperature sensor 31, the pressure sensor 35, hydrogen the flowmeter 69, the power output cable 8, and the storage battery 6 are used to achieve combined five control. Data packets are set, and by controlling the amount of water, the system is enabled to stably and normally operate, so as to produce a stable flow of hydrogen that satisfies the requirements, in the meanwhile, to ensure that no additional water enters the magnesium hydride storage tank and satisfies the power requirements of the power output cable 8. The magnesium hydride storage tank is filled with a hydrogen storage material which is mainly composed of metal magnesium and has a hydrogen content of 7.5% of the total weight of the added magnesium hydride. If the reaction is complete after adding water, an amount of hydrogen that is about 15 wt. % of a total weight of magnesium hydride is generated, and a large amount of heat is released. This part of heat is carried out via the thermal conductive oil outlet 17 by the thermal conductive oil within the jacket of the magnesium hydride storage tank 15. In FIG. 7, the waste heat enters the waste heat recoverer for waste heat power generation, and the temperature of the thermal conductive oil at the inlet of the waste heat recoverer is no more than 150° C. Hydrogen produced in 67 of the waste heat recoverer has a pressure of 20 MPa and enters the expander 64 to do work, so as to drive the generator 65 to generate electricity, and the generated electric energy is stored in the storage battery 6.

The magnesium hydride storage tank 15 is a metal material that is tightly sealed and completely isolated from the outside. Saturated magnesium hydride is added by THE magnesium hydride injection gun into the magnesium hydride storage tank via the stop valve with the password lock, and the stop valve with the password lock is closed at the same time. The inner system operates to add water and release all the generated hydrogen, the metal magnesium hydride is converted into dry magnesium hydroxide. Then, the stop valve with the password lock is opened, and magnesium hydroxide is extracted out by the injection gun. Thereafter, saturated magnesium hydride is fed to the magnesium hydride storage tank. The hydrogen fuel cell is a proton membrane fuel cell with an operating temperature of 30-80° C. and is configured to outputs a DC current. By performing online statistics of the release amount of hydrogen by the hydrogen flowmeter 69, the remaining release amount of hydrogen in the magnesium hydride storage tank can be obtained in real time. All device information and all sensor signals are transmitted to an ECU unit for unified control.

When the water tank is used in outdoor in winter, sodium chloride is added to the water tank to form a 3% antifreeze sodium chloride aqueous solution therein, and the filtration membrane is arranged at the outlet of the water tank, such that sodium chloride is always retained in the water tank. After passing through the membrane, the soft water enters the magnesium hydride storage tank, thereby preventing the low temperature and freezing problem of the water system in winter. If there is excess hydrogen in the pipeline between the water tank and the magnesium hydride storage tank, it can also ensure that the hydrogen passes through the filtration membrane and enters the magnesium hydride storage tank.

The air purifier 11 effectively purifies the air entering the hydrogen fuel cell to meet the needs of the hydrogen fuel cell. The purified air particulate matter is less than 500 micrograms per standard cubic meter.

Second Embodiment

Figure 4:
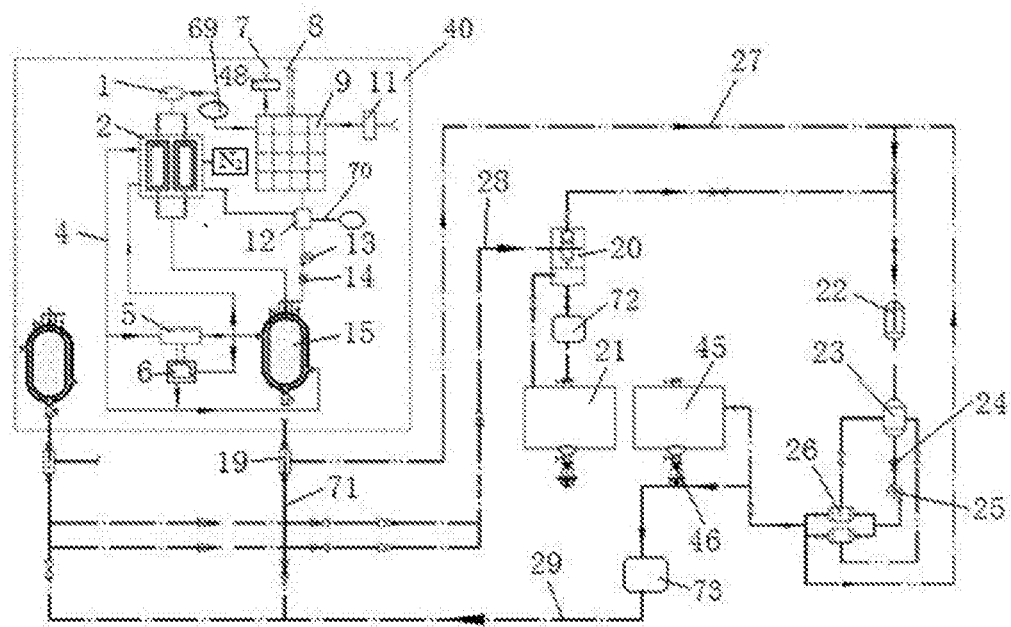
FIG. 4 is a flow chart of an energy system with hydration of magnesium hydride provided with a magnesium hydride replacing assembly.
Figure 8:
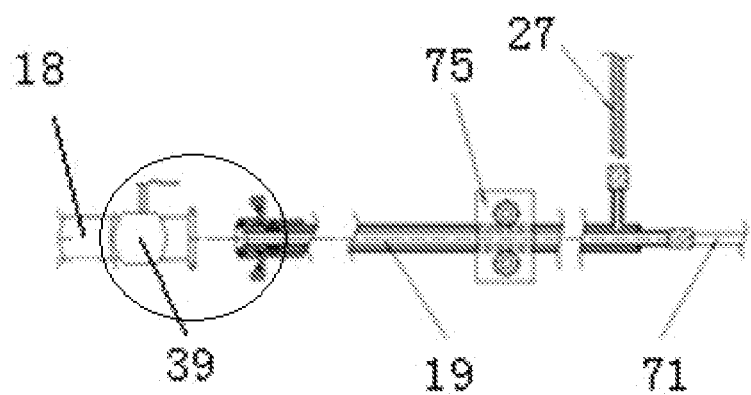
FIG. 8 is a schematic view of connection between a feeding-extraction port and an injection gun.
Figure 9:
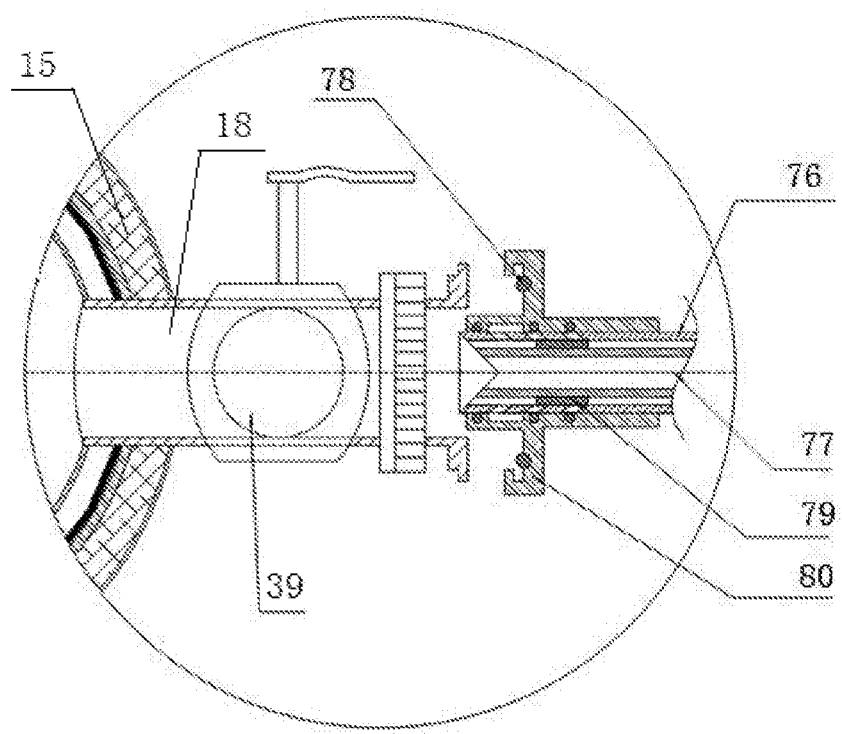
FIG. 9 is enlarged view of a part of FIG. 8.

FIG. 4 is another embodiment of the present application, the system comprises: a magnesium hydride replacing assembly and an energy release assembly 40. The magnesium hydride replacing assembly comprises: a separation tank 20, a magnesium hydroxide storage tank 21, a residual hydrogen absorption unit 22, a vacuum tank 23, a protective gas compressor 25, a high pressure protective gas tank 26, a magnesium hydride supplementary storage tank 45, a feeder 46, an extraction meter 72, a feeding meter 73, an injection gun driver mechanism, and an injection gun 19. The injection gun 19 is connected to the injection gun driver mechanism. As shown in FIGS. 8-9, the injection gun driver mechanism comprise: an outer pipe 76, an inner pipe 77, a sealing ring 78, a filter screen 79, and a locking flange 80. The outer pipe is connected to a protective gas pipeline 27, the inner pipe is connected to a feeding-extraction common pipeline 71, the feeding-extraction port 18 of the magnesium hydride storage tank 15 is provided with the stop valve 39 with the password lock, and the injection gun is in sealed connection with the feeding-extraction port 18 via the locking flange. Two high pressure protective gas tanks are provided, the two high pressure protective gas tanks work alternately, and a bypass is arranged between the high pressure protective gas tank and the vacuum tank. The energy release assembly is the energy system with hydration of magnesium hydride in Example 1, and comprises: two magnesium hydride storage tanks 15, the waste heat recoverer 5, the storage battery 6, the hydrogen buffer and temperature regulation tank 1, the molecular sieve filter 2, the hydrogen fuel cell 9, the air feeding port 10, the exhaust gas purifier 48, the purified gas discharge port 7, the water tank 12, the water pump 13, the flowmeter 14, and the air purifier 11. The two magnesium hydride storage tanks have the same external pipeline configuration and are switched by a valve. The two magnesium hydride storage tanks alternately discharge hydrogen and replace materials. The storage battery is electrically connected to the waste heat recoverer. The number of the magnesium hydride storage tanks 15 is two, and the two magnesium hydride storage tanks operate alternately. The injection gun defines therein a protective gas inlet and a feeding-discharging port. The feeding-discharging port is connected to the separation tank 20 through the feeding-extraction common pipeline 71 and the extraction pipeline 28. A solid outlet of the separation tank is connected to the magnesium hydroxide storage tank via the extraction meter 72, thereby accurately metering the extracted magnesium hydroxide. A gas outlet of the separation tank is connected to the vacuum tank through the residual hydrogen absorption unit, and the vacuum tank is connected to the high pressure protective gas tank through the check valve 24 and the protective gas compressor. Two paths are diverged from an outlet of the high pressure protective gas tank, one path is connected to the feeder 46, and the other path is connected to a protective gas inlet of the injection gun through the protective gas pipeline 27. The magnesium hydride supplementary storage tank is connected to the feeding-discharging port of the injection gun through the feeder, the magnesium hydride meter 73, the feeding pipeline 29, and the feeding-extraction common pipeline 71, and the saturated magnesium hydride added is accurately metered. The connection relationship and operation mode of the energy release assembly are the same as those in the first embodiment. The system can also adopt gravity conveyance, mechanical conveyance, pneumatic conveyance, vacuum conveyance, hydraulic conveyance, electromagnetic conveyance, and other methods, or a combination thereof. In summary, the tank body is opened through the password lock to discharge the magnesium oxide out of the magnesium hydride storage tank, then magnesium hydride is added, and the tank body is closed and sealed, so that any method of material replacement of magnesium hydroxide and magnesium hydride in the magnesium hydride storage tank can be reliably realized.

After all the magnesium hydride in the magnesium hydride storage tank is converted into magnesium hydroxide, the materials in the magnesium hydride storage tank need to be replaced, the magnesium hydroxide is discharged, and the saturated magnesium hydride raw material is added to keep the dehydrogenation process continuous. The injection gun can be freely extended into or retracted out of the magnesium hydride storage tank to realize the addition of magnesium hydride and the extraction of magnesium hydroxide. The protective gas is nitrogen, carbon dioxide, or other inert gases, which are allowed to operate in a pressurized manner, and does not exclude the use of the supercritical state of the above-mentioned gas. The magnesium hydride replacing assembly is connected to the feeding-extraction port 18 of the magnesium hydride storage tank to be replaced by the injection gun 19, and the replacement operation is performed as follows: 1) the injection gun is aligned with an injection port, and the feeding-extraction port is opened. The stop valve 39 with the password lock of the feeding-extraction port 18 is opened, the password lock is opened by the signal transmitted from the controller center, and the locking flange of the injection gun is connected to the flange of the injection port. 2) The magnesium hydroxide in the magnesium hydride storage tank is extracted from the magnesium hydride storage tank in a gas flow conveying manner, and passes through the extraction pipeline 28 to the separation tank 20 where gas-solid separation is performed. The separated solid enters the magnesium hydroxide storage tank 21, while the separated protective gas (nitrogen) is discharged from the separation tank via a top thereof and passes the residual hydrogen absorption unit 22, the vacuum tank 23, the check valve 24, and the protective gas compressor 25 to the high pressure protective gas tank 26. Nitrogen in the high pressure protective gas tank 26 provides a power required for the pneumatic conveyance for the extraction and addition process. Magnesium hydroxide in the magnesium hydroxide storage tank 21 is transported to a regeneration unit, where magnesium hydroxide is converted into magnesium hydride, and the produced magnesium hydride is then transported back for use. The regeneration can utilizes the peak-shaving power of clean energy for electrolytic regeneration and hydrogenation of magnesium metal. 3) The saturated magnesium hydride is added to the magnesium hydride storage tank in the gas flow conveying manner. The saturated magnesium hydride in the magnesium hydride supplementary storage tank 45 is conveyed to the injection gun via the feeder 46 and the feeding pipeline 29, and nitrogen in the high pressure protective gas tank 26 provides pneumatic conveying power to fill the magnesium hydride storage tank with the saturated magnesium hydride material. 4) After the fill is completed, the stop valve 39 with the password lock is closed, the injection gun is pulled out, and alternate time of the two magnesium hydride storage tanks is determined according to the magnesium hydride dehydration in the magnesium hydride storage tank 15. The operation process of the energy release assembly is the same as that of the first embodiment.

Third Embodiment

Figure 5:
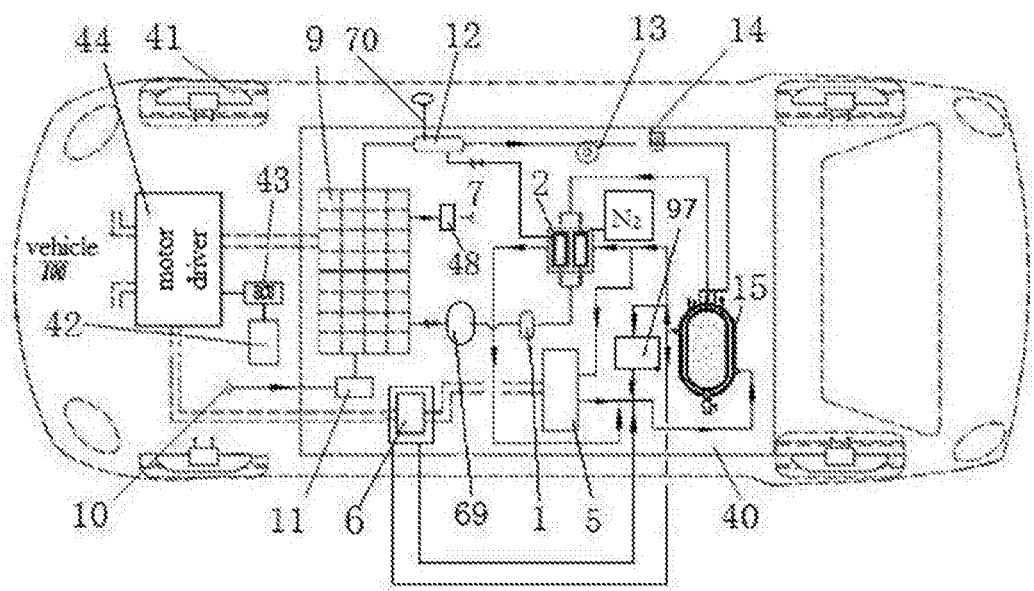
FIG. 5 is a flow chart of a third embodiment of the present application.

A third embodiment of the present application is shown in FIG. 5, which is an energy system installed in a vehicle, comprising: an energy release assembly, a wheel motor 41, a manual control console 42, a central controller 43, and a motor driver 44. The energy release assembly comprises: a magnesium hydride storage tank 15, a waste heat recoverer 5, a hydrogen buffer and temperature regulation tank 1, a molecular sieve filter 2, a hydrogen fuel cell 9, an air feeding port 10, a water tank 12, a water pump 13, a flowmeter 14, a purified gas discharge port 7, and an air purifier 11. The storage battery is connected to the waste heat recoverer circuit, and the number of the magnesium hydride storage tank 15 is one. A path at a thermal conductive medium outlet 17 of the magnesium hydride storage tank is connected to the thermal conductive medium inlet 16 through a vehicle air conditioner 97. The hydrogen fuel cell is electrically connected to the motor driver through the power output cable 8, the waste heat recoverer is electrically connected to the storage battery, and the storage battery is electrically connected to the motor driver. The manual control console is electrically connected to the motor driver via the central controller, and the wheel motor 41 is electrically connected to the motor driver. Working process of a vehicle having an energy system is as follows: the electricity generated by the hydrogen fuel cell 9 of the energy release assembly 40 and the power generated by the waste heat recoverer are transmitted to the motor driver 44 for driving the vehicle to run, or to the storage battery 6 for storing the electricity, via cables according to actual operating conditions of the vehicle. The electricity recovered by the wheel motor 41 when braking or decelerating during driving is stored in the storage battery as supplementary electricity.

The thermal conductive medium of the magnesium hydride storage tank is nitrogen, one path diverged from the thermal conductive medium outlet is connected to the waste heat recoverer; one path is connected to a jacket inlet of the molecular sieve filter; one path is connected to an inlet of an insulation jacket of the storage battery to enable the storage battery to work in winter at a suitable temperature; and a further path is connected to the vehicle air conditioning system for heating in winter. The vehicle is an electric car, and two energy configuration design schemes can be provided. One energy configuration is as follows: when the power of the storage battery is greater than the power of the fuel cell, the storage battery works as a main power, the fuel cell works as a supplementary power and is used to charge the storage battery. In this way, the power consumption for the starting and running of the vehicle is supplied by a combination of the storage battery and the fuel cell or individually by the storage battery. The energy release assembly of the fuel cell can be miniaturized. The battery of an electric or hybrid car can be charged by a charging plug, or the energy release assembly of the fuel cell can be removed from the vehicle to replace the fuel in the energy release assembly. Slow charging of electric cars or hybrid cars can be done under any operating conditions, and fast charging is allowed in extreme situations, which greatly reduces the weight and number of batteries of electric cars or hybrid cars, and significantly improves the battery life. The other energy configuration is as follows: the power of the storage battery is less than the power of the fuel cell. The fuel cell works as the main power and the storage battery works as the supplementary power. In this way, the power consumption for the running of the vehicle is supplied by a combination of the fuel cell and the storage battery or individually by the fuel cell, and the storage battery provides energy for starting and accelerating the car. The storage battery of the car is additionally equipped with an insulation jacket, and the heat source of the insulation jacket is the heat generated during the hydration of the magnesium hydride storage tank.

In winter, calcium chloride is added to the water tank, a 5% antifreeze calcium chloride aqueous solution is formed in the water tank, and an ion exchange membrane is provided at the outlet of the water tank.

Fourth Embodiment

Figure 6:
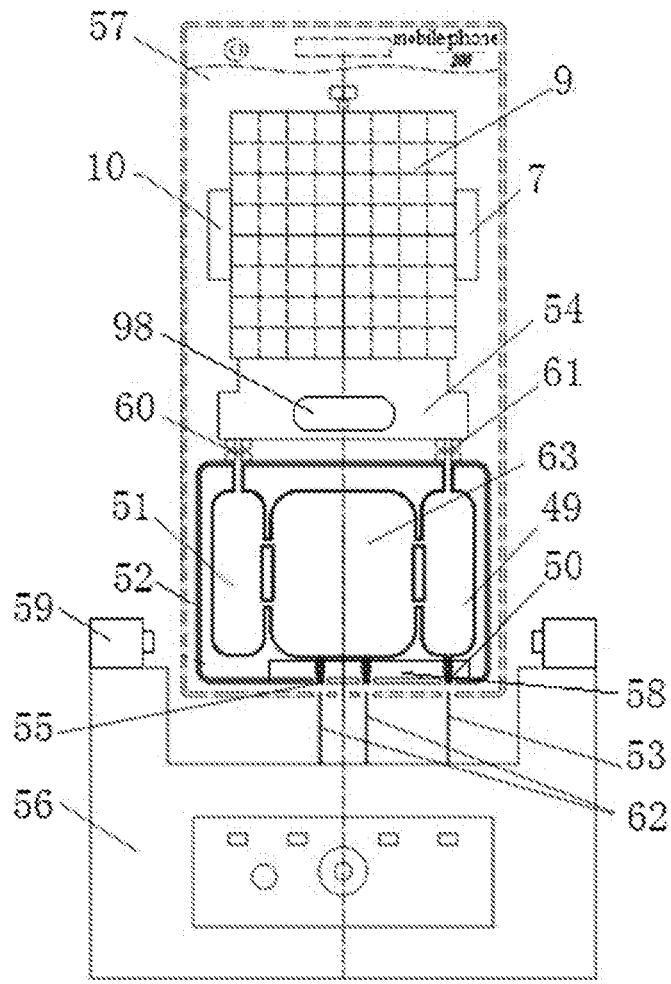
FIG. 6 is a flow chart of a fourth embodiment of the present application.

The fourth embodiment of the present application is shown in FIG. 6, which is an application of the energy system with hydration of magnesium hydride to the mobile phone, including: a mobile phone 57 and an external feeding apparatus 56. The mobile phone 57 comprises: a hydrogen fuel cell 9, a mobile phone battery 98, and a super safe battery box 52. The hydrogen fuel cell is provided with an air feeding port 10, a purified gas discharge port 7, and a super safe battery box interface module 54. The hydrogen fuel cell is connected to the super safe battery box interface module 54. The super safe battery box is provided therein with a hydrogen control module 51, a magnesium hydride module 63, and a water control module 49. The super safe battery box interface module is connected to the hydrogen control module 51 through a hydrogen interface 60, and is connected to the water control module through a water interface 61. The water control module is provided with a water feeding hole 50, the magnesium hydride module is provided with a hydride replacing hole 55, and the external feeding apparatus is provided with a water feeding pin 53 and a hydride replacing pin 62. The water control module is connected to the water feeding pin via the water feeding hole 50, and the magnesium hydride module is connected to the hydride replacing pin via the hydride replacing hole. The external feeding apparatus 56 comprises: an automatic positioning clamp 59, a miniature magnesium hydride replacing assembly, a water addition/extraction assembly, a low-temperature hydrogen absorber, and an intelligent management assembly. The structure and principle of the miniature magnesium hydride replacing assembly are as shown in FIG. 4 of the first embodiment. The mobile phone is provided with a password lock, and the water feeding pin 53 and the hydride replacing pin 62 are provided with corresponding passwords. During the insertion process, the mobile phone recognizes the password on the two pins. When the passwords match, the password lock is opened to replace the magnesium hydride and water. The hydrogen fuel cell 9 and the super safe battery box 52 can be integrated as a whole or split, and can be integrally solidified in the mobile phone, or can be used as removable parts.

Working principle of the mobile phone with the energy system with hydration of magnesium hydride is as follows: water in the water control module 49 enters the magnesium hydride module 63 through a membrane between the water control module and the magnesium hydride module to react with magnesium hydride to produce hydrogen and magnesium hydroxide. Hydrogen enters the hydrogen fuel cell through the hydrogen interface 60, and hydrogen enters the hydrogen control module 51 through a membrane between the magnesium hydride module and the hydrogen control module. The membrane is unidirectional, and only hydrogen is allowed to enter the hydrogen control module through the magnesium hydride module. The membranes can also be replaced with micro valves, which are also the check valve door. Hydrogen in the hydrogen fuel cell reacts with the air entering through the air feeding port 10 to produce water and generate electricity for the mobile phone. Produced water enters the water control module 49 via the water interface 61. After magnesium hydride in the magnesium hydride module 63 is completely converted into magnesium hydroxide, replacement of magnesium hydroxide is performed by inserting the mobile phone into the external feeding apparatus 56. During the replacement process, the mobile phone is firstly inserted into the external feeding apparatus 56, and the mobile phone is automatically clamped by the automatic positioning clamp 59. The mobile phone recognizes the pins, and when the passwords of the pins and holes match, the recognition of the password lock 58 on the mobile phone is completed. Saturated magnesium hydride will not be added until extraction of magnesium hydroxide is completed. The specific extraction and addition process is as follows: magnesium hydroxide in the magnesium hydride module 63 is discharged to the external feeding apparatus through the hydride replacing pin 62, and then saturated magnesium hydride is supplemented to the magnesium hydride module 63 through the hydride replacing pin 62. Water is supplied to the water control module 49 through the water feeding pin 53 or excess water is withdrawn out of the water control module 49 through the water feeding pin 53. A trace amount of hydrogen accompanied by magnesium hydroxide during the above process is absorbed by the low-temperature hydrogen absorber arranged in the external feeding apparatus 56. Magnesium hydroxide in the external feeding apparatus 56 is regularly replaced at business service outlets, where magnesium hydroxide is discharged and saturated magnesium hydride is fed.

In winter, calcium chloride is added to the water control module, a 2% antifreeze calcium chloride aqueous solution is formed in the water control module, and a reverse osmosis membrane is arranged at the outlet of the water control module. The mobile phone battery can be arranged in the mobile phone. The mobile phone battery is arranged in parallel with the fuel cell. According to the power consumption, the power supply and demand are adjusted through intelligent control. The mobile phone battery is preferentially charged on the premise that the normal use of the mobile phone is satisfied. The mobile phone battery can be large or small according to actual needs, and the mobile phone battery can also use external power to store electricity. The miniature magnesium hydride replacing assembly of the external feeding apparatus 56 has the same structure and principle as the magnesium hydride replacing assembly in Example 2, and is made of miniaturized structure of respective components. The magnesium hydride module 63 generally has a normal temperature of no exceeding 50° C., and a standby time of 7 days under normal use.

Fifth Embodiment

Figure 10:
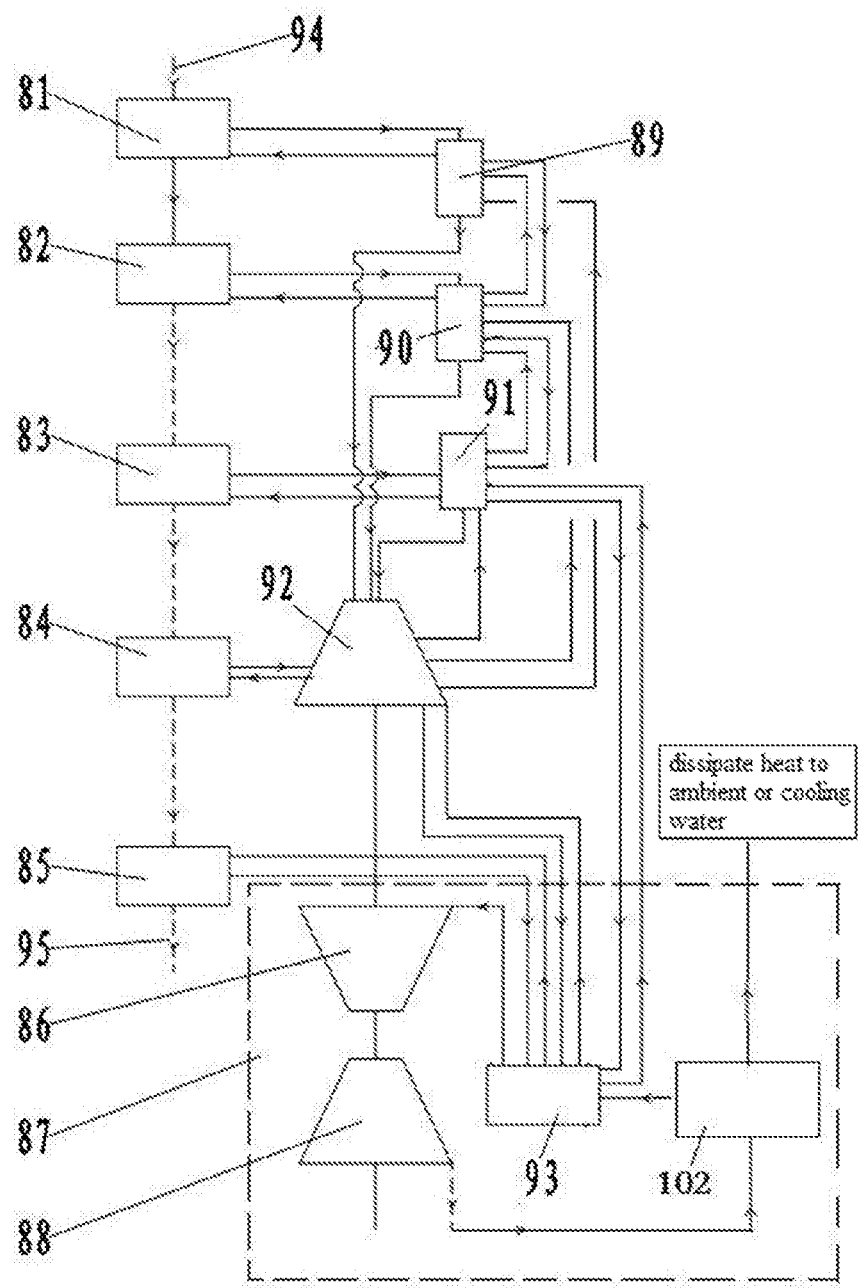
FIG. 10 is a schematic view of a complex waste heat recoverer.

The waste heat recoverer can also be applied to recover high-temperature waste heat from, for example, a piston engine or a gas turbine, and its structure is adjusted accordingly to become a complex waste heat recoverer. As shown in FIG. 10, the complex waste heat recoverer comprises: a first heat exchanger 81, a second heat exchanger 82, a third heat exchanger 83, a fourth heat exchanger 84, a fifth heat exchanger 85, a compression and expansion combined cycle assembly 87, a first hydrogen reaction bed group 89, a second hydrogen reaction bed group 90, a third hydrogen reaction bed group 91, a thermal conductive medium circulation inlet pipeline 94, and a thermal conductive medium circulation outlet pipeline 95. The compression and expansion combined cycle assembly comprises: a working fluid compressor 86, a working fluid expander 88, a sixth heat exchanger 93, and a seventh heat exchanger 102. The expander 92, the working fluid compressor 86, and the working fluid expander 88 are coaxially connected. The thermal conductive medium circulation inlet pipeline 94 is connected to a thermal conductive medium circulation inlet of the first heat exchanger 81, and the first heat exchanger 81 is connected to the thermal conductive medium circulation outlet pipeline 95 through the second heat exchanger 82, the third heat exchanger 83, the fourth heat exchanger 84, and the fifth heat exchanger 85 sequentially. The first heat exchanger 81 is in cyclic connection with the first hydrogen reaction bed group 89, the second heat exchanger 82 is in cyclic connection with the second hydrogen reaction bed group 90, the third heat exchanger 83 is in cyclic connection with the third hydrogen reaction bed group 91, the expander 92 is in cyclic connection with the fourth heat exchanger 84, the fifth heat exchanger 85 in cyclic connection with the sixth heat exchanger 93, the sixth heat exchanger 93 is in connection with the seventh heat exchanger 102, and the seventh heat exchanger 102 dissipates heat to an ambient environment or to a cooling water. The first hydrogen reaction bed group 89, the second hydrogen reaction bed group 90, and the third hydrogen reaction bed group 91 are respectively in cyclic connection with the expander 92, the expander 92 is in cyclic connection with the sixth heat exchanger 93, and the sixth heat exchanger 93 is connected to an inlet of the working fluid compressor 86, and an outlet of the working fluid expander 88 is connected to the sixth heat exchanger. The first hydrogen reaction bed group is in cyclic connection with the second hydrogen reaction bed group, the second hydrogen reaction bed group is in cyclic connection with the third hydrogen reaction bed group, and the third hydrogen reaction bed group is in cyclic connection with the sixth heat exchanger. All cyclic connections are thermal conductive medium heat flow pipelines. Each of the hydrogen reaction bed groups comprises six hydrogen reaction beds, and the structure and operation mode thereof are the same as those in the first embodiment.

Exhaust heat at 600° C. from a piston-type internal combustion engine or a gas turbine is used to generate electricity. The exhaust heat at 600° C. is introduced to the first hydrogen reaction bed group 89, the second hydrogen reaction bed group 90, and the third hydrogen reaction bed group 91 in sequence through the thermal conductive medium heat flow pipeline. The high-temperature waste heat is used to generate electricity, and the mechanical efficiency reaches about 60% of the exhaust heat. Then, the low-temperature waste heat of the exhaust gas is utilized by the compression and expansion combined cycle assembly 87 to continue to do work for power generation, such that all the heat at above 35° C. in the exhaust gas is completely utilized, and the mechanical efficiency can reach about 15% of the exhaust heat. The low-temperature waste heat at above 35° C. comes from three parts. The first part is all the heat collected after full thermal insulation the entire piston-type internal combustion engine or the gas turbine and the exhaust system. The second part is the heat dissipated from the hydrogen reaction bed groups and the expander in the Covapor device. The third part is the heat released from the hydrogen absorption in the hydrogen reaction bed group at 60° C. The mechanical efficiency of using the waste heat by the above complex Covapor device can reach about 75% of the exhaust heat.

Working process of the complex waste heat recoverer is as follows:

1. The exhaust gas at 600° C. passes through the first heat exchanger, where heat is brought in and heats the first hydrogen reaction bed group to produce a high-temperature high-pressure hydrogen at 500° C. and 35 MPa. The high-temperature high-pressure hydrogen at 500° C. and 35 MPa enters the expander 92 to do work and converted into a low-pressure hydrogen at 350° C. and 2 MPa, which enters the first hydrogen reaction bed group to absorb hydrogen and release heat.
2. The exhaust gas at 510° C. at the outlet of the first heat exchanger passes through the second heat exchanger, where heat is brought in and heats the second hydrogen reaction bed group, and at the same time, the heat released from hydrogen absorption of the first hydrogen reaction bed group is also gathered to the second hydrogen reaction bed group, so as to produce a high-pressure hydrogen at 350° C. and 35 MPa. The high-pressure hydrogen at 350° C. and 35 MPa enters the expander 92 to do work and converted into a low-pressure hydrogen at 200° C. and 2 MPa, which enters the second hydrogen reaction bed group to absorb hydrogen and release heat.
3. The exhaust gas at 350° C. at the outlet of the second heat exchanger passes through the third heat exchanger, where heat is brought in and heats the third hydrogen reaction bed group, and at the same time, the heat released from hydrogen absorption of the second hydrogen reaction bed group is also gathered to the third hydrogen reaction bed group, so as to produce a high-pressure hydrogen at 200° C. and 35 MPa. The high-pressure hydrogen at 200° C. and 35 MPa enters the expander 92 to do work and converted into a low-pressure hydrogen at 60° C. and 2 MPa, which enters the third hydrogen reaction bed group to absorb hydrogen and release heat. The expander 92 is divided into three groups of blades, each group of blades can have multiple stages, and each group has the same pressures but different temperatures at the inlet and the outlet thereof, thereby allowing multiple stages of taps in each group of blades to exchange heat with the fourth heat exchanger 84 to improve work efficiency.

4. The low-temperature waste heat at above 35° C. is used by the compression and expansion combined cycle assembly 87 to continue to do work for power generation, so as to utilize all the heat at above 35° C. in the exhaust gas. The low-temperature waste heat at above 35° C. mainly comes from three parts. A first part is all the heat collected after full thermal insulation of the entire piston internal combustion engine or the gas turbine and the exhaust system. The second part is the heat dissipated from the hydrogen reaction bed groups and the expander 92 in the Covapor device. The third part is heat released from hydrogen absorption of the third hydrogen reaction bed group at 60° C. The above three parts of heat are brought into the sixth heat exchanger 93 and heat the working medium to no less than 35° C., the heated working medium is compressed by the working fluid compressor 86 to 220° C. and 2 MPa. The dynamic of the working fluid compressor 86 comes from the expander 92, and all the dynamic of the expander 92 is used to drive the working fluid compressor 86 to do work via the working fluid expander 88, making an outlet of the working fluid expander 88 at 35° C. and 0.1 MPa. Thereafter, the working medium enters the seventh heat exchanger 102 to dissipate heat to the ambient environment or to the cooling water, decreasing the temperature to no higher than 20° C., thereafter enters the sixth heat exchanger, thereby doing work in a cyclic manner. The working medium is dioxide or other organic compounds. Some parts of the dynamic of the expander 92 may be selected to drive the working fluid compressor 86 to operate according to different working medium and environmental temperature, as long as all the heat above a certain temperature is utilized to do work, another part of dynamic of the expander 92 is output in the form of shaft work.

Figure 11:
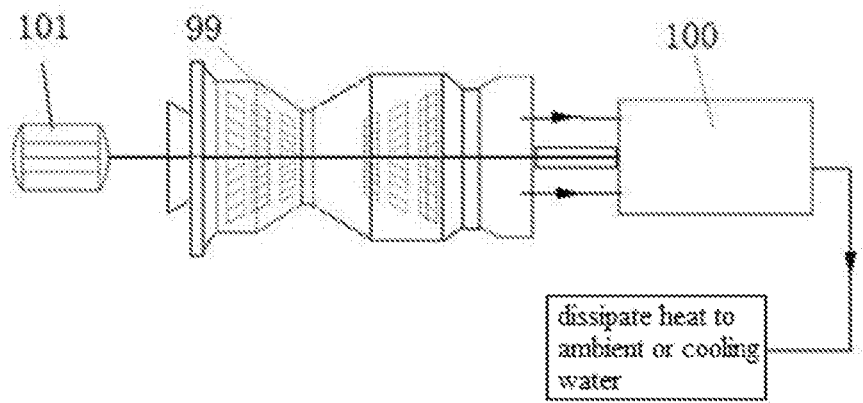
FIG. 11 is a schematic view of connection between a complex waste heat recoverer and a gas turbine.

The complex waste heat recoverer is combined with the gas turbine by coaxial connection, as shown in FIG. 11, and becomes a component of the gas turbine, so that the mechanical efficiency of the gas turbine reaches about 85%, the complex waste heat recoverer can be coaxially combined with the piston engine, and can also utilize any form of waste heat, and can also be combined with the gas turbine or the piston engine in a non-coaxial manner.

Sixth Embodiment

Figure 12:
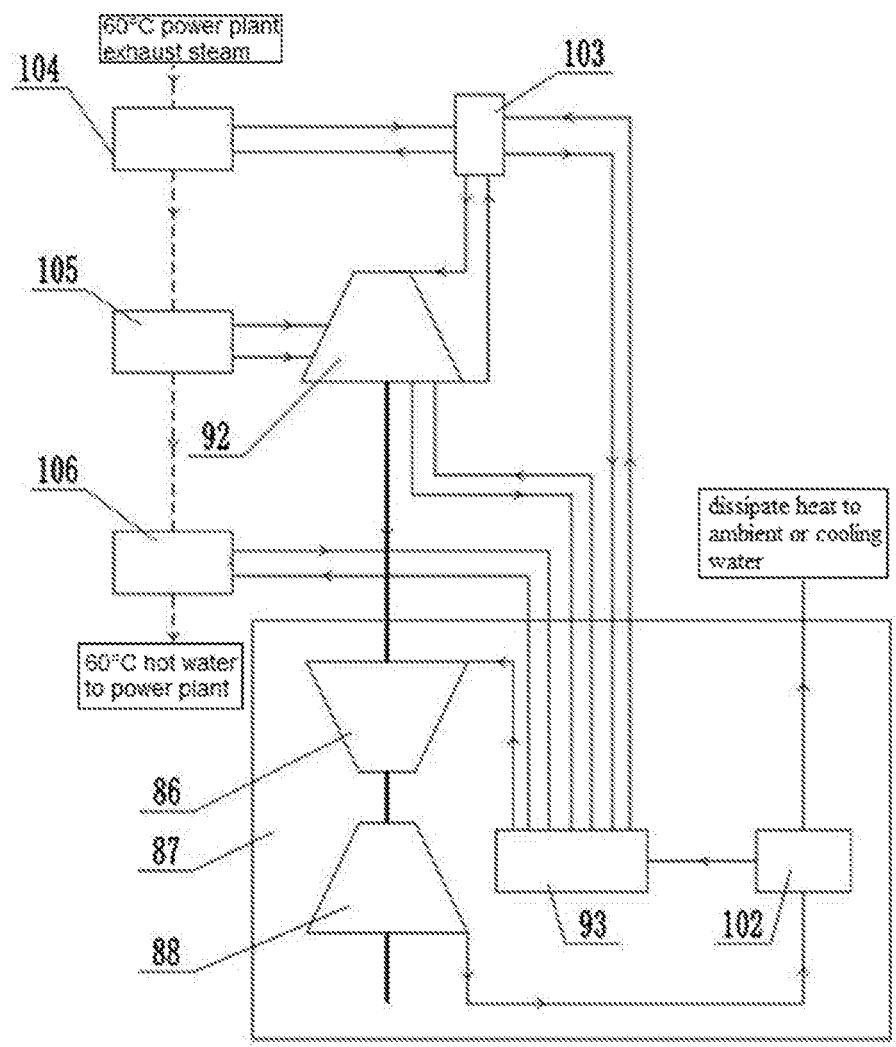
FIG. 12 is a schematic view of a second complex waste heat recoverer.

As shown in FIG. 12, the sixth embodiment of the present application is a second type of complex waste heat recoverer, which comprises: a hydrogen reaction bed 103, a primary heat exchanger 104, a secondary heat exchanger 105, a final heat exchanger 106, an expander 92, a compression and expansion combined cycle assembly 87, a 60° C. power plant exhaust steam pipeline, and a 60° C. hot water pipeline. The compression and expansion combined cycle assembly comprises: a working fluid compressor 86, a working fluid expander 88, a sixth heat exchanger 93, and a seventh heat exchanger 102. The expander, the working fluid compressor, and the working fluid expander are shaft-connected. The 60° C. power plant exhaust steam pipeline is connected to the 60° C. hot water pipeline through the primary heat exchanger, the secondary heat exchanger, and the final heat exchanger sequentially, and the 60° C. hot water pipeline is connected to a power plant boiler. A hydrogen outlet of the hydrogen reaction bed is connected to an inlet of the expander, and an outlet of the expander is connected to a hydrogen inlet of the hydrogen reaction bed. The primary heat exchanger is in cyclic connection with the hydrogen reaction bed, the secondary heat exchanger is in cyclic connection with a middle section of the expander, the final heat exchanger is in cyclic connection with the sixth heat exchanger, the hydrogen reaction bed is in cyclic connection with the sixth heat exchanger, the sixth heat exchanger is connected to an inlet of the working fluid compressor, an outlet of the working fluid expander is connected to the seventh heat exchanger, the sixth heat exchanger is connected to the seventh heat exchanger, and the seventh heat exchanger 102 dissipates heat to an ambient environment or to a cooling water.

The waste heat recoverer can also be applied to recover low-temperature waste heat, for example, exhaust steam condensing heat at 60° C. from a power plant, and its structure is adjusted accordingly to become a complex waste heat recoverer. As shown in FIG. 12, the exhaust steam condensing heat at 60° C. from the power plant is used to generate electricity. The exhaust steam condensing heat at 60° C. is introduced to the hydrogen reaction bed 103 through the heat transfer medium heat flow pipeline of the primary heat exchanger 104. The condensing heat is used to generate electricity with an efficiency of about 15%, hot water at 60° C. after condensation returns to the power plant to generate steam. The low-temperature exhaust heat part of the exhaust steam condensing heat is utilized by the compression and expansion combined cycle assembly 87 to continue to do work for power generation, so as to utilize all the heat at above 35° C. from the working medium, the utilization efficiency can reach 32%. The low-temperature waste heat at above 35° C. comes from three parts. One part is all the heat collected after thermal insulation of the entire exhaust steam waste heat power generation system. The second part is the heat dissipated from the hydrogen reaction bed and the expander of the waste heat recoverer, and the third part is the heat released from hydrogen absorption of the hydrogen reaction bed 103 at 35° C. The waste heat utilization efficiency can reach about 47% by using the above-mentioned complex Covapor device. Working process of the complex waste heat recoverer is as follows: 1. The exhaust steam at 60° C. from the power plant is introduced to the primary heat exchanger, where the condensing heat is brought in and heats the hydrogen reaction beds, and generates hydrogen under pressure at 60° C. and 0.5 MPa to enter the expander 92 to do work, during which, the low-temperature hydrogen is reheated by the secondary heat exchanger 105 to improve the work ability, and converted into a low-pressure hydrogen at 35° C. and 0.1 MPa after the work. The low-temperature hydrogen at 35° C. and 0.1 MPa enters the hydrogen reaction bed to absorb hydrogen and release heat. 2. The low-temperature waste heat at above 35° C. is utilized by the compression and expansion combined cycle assembly to continue to do work for power generation, so as to utilize all the heat at above 35° C. in the working medium. The low-temperature waste heat at above 35° C. comes from three parts. First part is the heat collected after the full thermal insulation of the entire exhaust steam waste heat power generation system. The second part is the heat dissipated from the hydrogen reaction bed and the expander of the Covapor device. The third part is the heat dissipated from the hydrogen absorption of the hydrogen reaction bed 103 at above 35° C. The working medium is carbon dioxide.

What is claimed is:

1. An energy system with hydration of magnesium hydride, comprising:

a magnesium hydride storage tank, a waste heat recoverer, and a storage battery; the storage battery being electrically connected to the waste heat recoverer, and the magnesium hydride storage tank being provided with a thermal conductive medium inlet, a thermal conductive medium outlet, a feeding-extraction port, a hydrogen outlet, and a water inlet; wherein the energy system further comprises: a hydrogen buffer and temperature regulation tank, a meter, a molecular sieve filter, a hydrogen fuel cell, an air feeding port, an exhaust gas purifier, a purified gas discharge port, a water tank, a water pump, a flowmeter, and an air purifier;

the hydrogen fuel cell comprises: a power output cable, an air inlet, a hydrogen inlet, a water outlet, and an exhaust gas outlet; the air feeding port is connected to the air inlet through the air purifier, and the exhaust gas outlet is connected to the purified gas discharge port through the exhaust gas purifier;

the water outlet of the hydrogen fuel cell is connected to the water tank, a water outlet of the molecular sieve filter is connected to the water tank, and the water tank is connected to a water feeding and regulating port; the water tank is connected to the water inlet of the magnesium hydride storage tank through the water pump and the flowmeter; a filtration membrane is arranged at a pipeline at the water inlet; and the hydrogen outlet of the magnesium hydride storage tank is connected to the hydrogen inlet of the hydrogen fuel cell through the molecular sieve filter, the hydrogen buffer and temperature regulation tank, and the meter;

the thermal conductive medium outlet of the magnesium hydride storage tank is diverged into three paths, a first path being connected to a jacket inlet of the molecular sieve filter through a thermal conductive oil pipeline, a second path being connected to the waste heat recoverer through the thermal conductive oil pipeline, and a third path being connected to an insulation jacket of the thermal conductive oil pipeline through the thermal conductive oil pipeline; and a jacket outlet of the molecular sieve filter is connected to the thermal conductive medium inlet of the magnesium hydride storage tank, an outlet of the waste heat recoverer is connected to the thermal conductive medium inlet of the magnesium hydride storage tank, and an outlet of the insulation jacket of the storage battery is connected to the thermal conductive medium inlet of the magnesium hydride storage tank; and the waste heat recoverer comprises: a first expander, a generator, a hydrogen thermocompressor, and an intermediate reheater; and an expander outlet is connected to an expander inlet through the hydrogen thermocompressor, the first expander and the generator are in axial connection, and the generator is in electrical connection with an external power system.

2. The energy system with hydration of magnesium hydride of claim 1, wherein the magnesium hydride storage tank is formed by an inner wall and an outer wall of a tank body, with a heat exchange jacket formed between the inner wall and the outer wall; a water spray pipeline is arranged inside the tank body, and an insulation layer is arranged outside the tank body;

a pressure sensor, an explosion-proof valve, the hydrogen outlet, the water inlet, and a temperature sensor are located at one end of the tank body; and the feeding-extraction port is located at the other end of the tank body; the feeding-extraction port is provided with a stop valve having a password lock; and the tank body is a metallic material, a non-metallic material, or a combination thereof.

3. The energy system with hydration of magnesium hydride of claim 1, further comprising a magnesium hydride replacing assembly, the magnesium hydride replacing assembly comprising: a separation tank, a magnesium hydroxide storage tank, a residual hydrogen absorption unit, a vacuum tank, a protective gas compressor, a high pressure protective gas tank, a magnesium hydride supplementary storage tank, a feeder, an extraction meter, a feeding meter, an injection gun driver mechanism, and an injection gun; and the injection gun driver mechanism comprising: an outer pipe, an inner pipe, a sealing ring, a filter screen, and a locking flange;

wherein
the outer pipe is connected to a protective gas pipeline, and the inner pipe is connected to a feeding-extraction common pipeline;
the injection gun driver mechanism is connected to the injection gun, and the injection gun is in sealed connection with the feeding-extraction port of the magnesium hydride storage tank via the locking flange;
the injection gun defines therein a protective gas inlet and a feeding-discharging port, the feeding-discharging port is connected to the separation tank via the feeding-extraction common pipeline and the extraction pipeline; a solid outlet of the separation tank is connected to the magnesium hydroxide storage tank via the extraction meter, a gas outlet of the separation tank is connected to the vacuum tank via the residual hydrogen absorption unit, and the vacuum tank is connected to the high pressure protective gas tank via the check valve and the protective gas compressor;
two paths are diverged from an outlet of the high pressure protective gas tank, one path is connected to the feeder, and the other path is connected to a protective gas inlet of the injection gun via the protective gas pipeline; and
the magnesium hydride supplementary storage tank is connected to the feeding-discharging port of the injection gun via the feeder, the feeding meter, the feeding pipeline, and the feeding-extraction common pipeline.

4. The energy system with hydration of magnesium hydride of claim 3, wherein
magnesium hydroxide in the magnesium hydroxide storage tank is configured to be transported to a regeneration unit and converted into magnesium hydride in the regeneration unit, and the magnesium hydride produced in the regeneration unit is configured to be transported back to the magnesium hydride storage tank for use; the regeneration utilizes a peak-shaving power of clean energy for electrolytic regeneration and hydrogenation of magnesium metal; and the energy system with hydration of magnesium hydride is applied to mobile apparatuses, transportation apparatuses, fixed apparatuses, household apparatuses, kitchen stoves, power generation apparatuses, clothing and footwear, power apparatuses or construction apparatuses.

5. The energy system with hydration of magnesium hydride of claim 1, wherein the energy system is configured to be installed in a vehicle, the vehicle comprises: an energy release assembly, a wheel motor, a manual control console, a central controller, and a motor driver; the hydrogen fuel cell is electrically connected to the motor driver through the power output cable, the manual control console is electrically connected to the motor driver via the central controller, and the wheel motor, the storage battery, and the motor driver are electrically connected;

the electricity generated by the hydrogen fuel cell of the energy release assembly and the power generated by the waste heat recoverer are configured to be transmitted to the motor driver for driving the vehicle to run, or to the storage battery for storing the electricity, via cables according to actual operating conditions of the vehicle; the electricity recovered by the wheel motor when braking or decelerating during driving is configured to be stored in the storage battery as supplementary electricity;

the thermal conductive medium of the magnesium hydride storage tank is nitrogen, the thermal conductive oil, carbon dioxide, or a heat stabilizing substance; and one path diverged from the thermal conductive medium outlet is connected to the waste heat recoverer; one path is connected to a jacket inlet of the molecular sieve filter; one path is connected to an inlet of an insulation jacket of the storage battery; and a further path is connected to the vehicle air conditioning system.

6. The energy system with hydration of magnesium hydride of claim 5, wherein the energy release assembly and an energy consumption unit are used separately or together for fixed apparatuses, mobile apparatuses, transportation apparatuses, or household apparatuses; the replacing assembly is placed in a fixed place or installed on a mobile apparatus.

7. The energy system with hydration of magnesium hydride of claim 1, comprising:

a mobile phone and an external feeding apparatus; the mobile phone comprising: the hydrogen fuel cell, a battery box, and a password lock; the external feeding apparatus comprising: a water feeding pin, a hydride replacing pin, an automatic positioning clamp, a miniature magnesium hydride replacing assembly, a water addition/extraction assembly, a low-temperature hydrogen absorber, and an intelligent management assembly; wherein the hydrogen fuel cell is provided with the air feeding port, the purified gas discharge port, and a battery box interface module; the hydrogen fuel cell is connected to the battery box interface module; the battery box is provided therein with a hydrogen control module, a magnesium hydride module, and a water control module; the battery box interface module is connected to the hydrogen control module through a hydrogen interface, and is connected to the water control module through a water interface; the water control module is provided with a water feeding hole, and the magnesium hydride module is provided with a hydride replacing hole; the water control module is connected to the water feeding pin via the water feeding hole, and the magnesium hydride module is connected to the hydride replacing pin via the hydride replacing hole; and the mobile phone battery is arranged in the mobile phone, and the mobile phone battery is arranged in parallel or in series with the fuel cell; and water in the water control module is configured to enter the magnesium hydride module through a first membrane between the water control module and the magnesium hydride module to react with magnesium hydride to produce hydrogen and magnesium hydroxide; hydrogen enters the hydrogen fuel cell through the hydrogen interface, and hydrogen enters the hydrogen control module through a second membrane between the magnesium hydride module and the hydrogen control module; the second membrane is unidirectional, and only hydrogen is allowed to enter the hydrogen control module through the magnesium hydride module; hydrogen in the hydrogen fuel cell reacts with the air entering through the air feeding port to produce water and generate electricity for the mobile phone; or alternatively, the mobile phone battery uses an external power to store electricity; and the magnesium hydride module has a normal temperature of between −40 and 100° C.

8. The energy system with hydration of magnesium hydride of claim 1, wherein the hydrogen thermocompressor adopts a multi-stage step utilization mode, and each step of the multi-stage step utilization mode is composed of multiple reaction beds loaded with a metal hydrogen storage material, comprising a rare-earth metal hydride; a low-pressure hydrogen enters the reaction beds via a low-pressure hydrogen inlet, the low-pressure hydrogen is absorbed by the hydrogen storage material to form a metal hydride, and the metal hydride after hydrogen absorption is heated to release high-pressure hydrogen.

9. The energy system with hydration of magnesium hydride of claim 1, wherein the exhaust gas purifier is composed of four modules: a NO/O3 catalytic reducer, an activated carbon adsorber, a CO/VOC oxidizer, and a particulate ion adsorber; and the NO/$O_3$ catalytic reducer, the activated carbon adsorber, the CO/VOC oxidizer, and the particulate ion adsorber are sequentially connected.

10. The energy system with hydration of magnesium hydride of claim 1, wherein the energy system comprises a complex waste heat recoverer, comprising: a hydrogen reaction bed, a primary heat exchanger, a secondary heat exchanger, a final heat exchanger, a second expander, a compression and expansion combined cycle assembly, a 60° C. power plant exhaust steam pipeline, and a 60° C. hot water pipeline; the compression and expansion combined cycle assembly comprises: a working fluid compressor, a working fluid expander, a sixth heat exchanger, and a seventh heat exchanger; the second expander, the working fluid compressor, and the working fluid expander are shaft-connected; and the 60° C. power plant exhaust steam pipeline is connected to the 60° C. hot water pipeline through the primary heat exchanger, the secondary heat exchanger, and the final heat exchanger sequentially; a hydrogen outlet of the hydrogen reaction bed is connected to an inlet of the second expander, and an outlet of the second expander is connected to a hydrogen inlet of the hydrogen reaction bed; the primary heat exchanger is in cyclic connection with the hydrogen reaction bed, the secondary heat exchanger is in cyclic connection with a middle section of the second expander, the final heat exchanger is in cyclic connection with the sixth heat exchanger, the hydrogen reaction bed is in cyclic connection with the sixth heat exchanger, the sixth heat exchanger is connected to an inlet of the working fluid compressor, an outlet of the working fluid expander is connected to the seventh heat exchanger, the sixth heat exchanger is connected to the seventh heat exchanger, and the seventh heat exchanger is in communication with an ambient environment or a cooling water.

11. The energy system with hydration of magnesium hydride of claim 1, wherein the hydrogen thermocompressor in the waste heat recoverer contains a metal hydride, which is configured to carry heat directly into the hydrogen reaction beds under a hydrogen release pressure via a thermal conductive medium fluid; the thermal conductive medium fluid is a gas or a liquid, and the gas is a reducing or inert gas, comprising: hydrogen, carbon monoxide, methane, nitrogen, carbon dioxide, argon, helium, or neon; and the liquid is a thermal conductive oil, or a high molecular organic solvent; and the hydrogen thermocompressor uses resistance heating, induction heating, electromagnetic heating, arc heating, radiant heating.

\* \* \* \* \*